United States Patent
Hamada

(10) Patent No.: US 6,577,434 B2
(45) Date of Patent: Jun. 10, 2003

(54) VARIABLE FOCAL POSITION SPATIAL MODULATION DEVICE

(75) Inventor: Masataka Hamada, Osakasayama (JP)

(73) Assignee: Minolta Co., Ltd., Osaka (JP)

( * ) Notice: Subject to any disclaimer, the term of this patent is extended or adjusted under 35 U.S.C. 154(b) by 30 days.

(21) Appl. No.: 09/757,706

(22) Filed: Jan. 11, 2001

(65) Prior Publication Data

US 2001/0055145 A1 Dec. 27, 2001

(30) Foreign Application Priority Data

Jan. 14, 2000 (JP) .................................. 2000-006525
Jan. 14, 2000 (JP) .................................. 2000-006526
Jan. 14, 2000 (JP) .................................. 2000-006527

(51) Int. Cl.[7] ................................................ G02F 1/00
(52) U.S. Cl. ..................................... 359/319; 354/315
(58) Field of Search ............................... 359/319, 318, 359/315, 321

(56) References Cited

U.S. PATENT DOCUMENTS

| 4,576,441 A | * 3/1986 | Kubick ....................... 350/355 |
| 4,888,724 A | * 12/1989 | Marom et al. ............... 364/807 |
| 4,909,626 A | * 3/1990 | Purvis et al. ................ 356/332 |
| 5,839,001 A | 11/1998 | Ohtaka et al. |
| 5,911,018 A | * 6/1999 | Bischel et al. ............... 385/16 |

FOREIGN PATENT DOCUMENTS

| JP | 2628630 | 4/1997 |
| JP | 9-304748 | 11/1997 |
| JP | 10-62609 | 3/1998 |

OTHER PUBLICATIONS

"Special Edition: Liquid Crystal Optical Elements and Applications of the Same," by Susumu Satoh, O Plus E, Oct. 1998, pp. 1118–1124 (with English translation).

* cited by examiner

Primary Examiner—Georgia Epps
Assistant Examiner—Richard Hanig
(74) Attorney, Agent, or Firm—McDermott, Will & Emery

(57) ABSTRACT

A variable focus position spatial modulator, which has a satisfactory image forming performance. The modulator includes: a variable refractive index part that is able to deflect an incident light; element pairs arranged at intervals in a concentric shape or the like generally oppositely to each other with interposition of the variable refractive index part; and a voltage applier for applying a voltage across the elements, wherein width of an element non-opposition region located between element opposition regions is wider than that of each inter-element element opposition region where the elements of each element pair face each other, and wherein the refractive index distribution of the variable refractive index part in the element non-opposition region is varied by the voltage applied to the adjacent element pairs, so that the focal position is varied.

28 Claims, 15 Drawing Sheets refractive index position in diametrical direction of lens refractive index position in diametrical direction of lens position in diametrical direction of lens position in diametrical direction of lens

VARIABLE FOCAL POSITION SPATIAL MODULATION DEVICE

This application is based upon application Nos. 2000-6525, 2000-6526 and 2000-6527 filed in Japan, the contents of which are hereby incorporated by reference.

BACKGROUND OF THE INVENTION

1. Field of the Invention

The present invention relates to a variable focal position spatial modulation device. More specifically, the present invention relates to the variable focal position spatial modulation device which is appropriately employed for, for example, a liquid crystal lens.

2. Description of the Related Arts

There have conventionally been a plastic mold Fresnel plate, a photographic dry plate type diffraction grating, a glass plate marking-off type diffraction grating, a photographic dry plate type hologram and a photoresist type hologram, in each of which the transmission or reflection optical path is fixed in the manufacturing stage.

As a technique for deflecting the transmission or reflection optical path, there are, for example, the following techniques.

Japanese Non-examined Patent Publication No. HEI 10-62609 proposes a microlens capable of adjusting the focal position. This changes the focal position of one lens and is effective only in the case of a small-diameter pupil lens. If the microlens is simply increased in dimension, then the necessary spherical surface (aspherical surface) cannot be obtained. Therefore, it is presumable that the practicality is difficult.

U.S. Pat. No. 5,839,001 discloses a technique for providing a deflection means for deflecting an incident optical path with a power. However, the lens power is not changed, and the pupil of the imaging lens cannot be effectively used.

A technique capable of forming a microlens array and changing the focal position is disclosed in O plus E, Vol. 20, No. 10, p.1118–1124, October 1998, "Liquid Crystal Microlens". However, only a lens having a diameter of several tens to several hundreds of micrometers can be formed.

Japanese Patent No. 2628630 (Japanese Non-examined Patent Publication No. SHO 62-170933) discloses a system in which electrodes are arranged in a concentric shape and varied voltages are successively applied to the ring-shaped electrodes. However, this system is a method for controlling the alignment and the refractive power between electrodes with liquid crystals held between them, and no description is provided for the alignment displacement and refractive power displacement between the ring-shaped electrodes. The alignment therebetween is tilted and the refractive power is varied by the influence of the electrodes between the ring-shaped electrodes. This portion generates an unnecessary refractive power and becomes a factor for generating flare.

Japanese Non-examined Patent Publication No. HEI 9-304748 discloses a technique with a multi-ring-shaped structure for producing a lens effect by reducing the electrode width in the radial direction from the center to the periphery. The technique is designed so as to have a variation in the refractive power between an electrode and an electrode. However, the alignment is tilted and the refractive power is varied by the influence of the electrodes in a portion between the multi-ring-shaped electrodes, and this portion generates an unnecessary refractive power and generates flare. The upper and lower electrodes are asymmetrically arranged and only one electrode voltage is provided. However, this is not intended to solve the problem of flare.

Conventionally, as a "bifocal lens system" capable of varying the focal position with a small device, the use of liquid crystals has been proposed. This produces a lens effect by forming electrodes on two substrates and varying the refractive index of the liquid crystals between the electrodes with interposition of the liquid crystals by arranging the electrodes in a multi-ring-like shape. This system utilizes the phenomena that no lens effect is produced as a result of the alignment of the liquid crystals parallel to the substrate when no electric field is applied and that the refractive power is varied as a result of the change of the alignment angle of the liquid crystals when an electric field is applied.

Although the method of controlling the alignment and the refractive power between the electrodes with interposition of the liquid crystals have been described, the behavior of the alignment displacement and the refractive power displacement generated between the ring-shaped electrodes has not been described. In practice, the alignment is tilted and the refractive index is varied by the influence of the electrodes between the ring-shaped electrodes, and this portion generates an unnecessary refractive power and becomes a factor for generating flare.

The generation of the flare causes the erroneous detection of sensing in focus detection and so on, and the flare causes degradation in image quality when used in an imaging system. This means that the lens does not produce a good performance.

The space between the electrodes with interposition of the liquid crystals has a constant refractive index, and the total refractive index of the device becomes a quantized refractive index of each ring. Due to these two factors, the lens does not realize a good performance.

FIGS. 1A through 1D show a conventional liquid crystal lens.

As shown in the schematic sectional view of FIG. 1A, a liquid crystal lens 500 is obtained by sealing liquid crystals 530 with substrates 510 and 520 that are arranged parallel and seal members 538 and 539. Electrodes 511, 512, 521 and 522 and alignment films 518 and 528 are arranged on mutually opposite surfaces of the substrates 510 and 520. The electrodes 511 and 512 and the electrodes 521 and 522 are formed in a ring shape concentric to an optical axis O and arranged opposite to each other. Then, in an electrode opposition region P between the opposite electrodes, the alignment of the liquid crystals 530 is varied by an electric field with an applied voltage, allowing the refractive index to be controlled to a specified refractive index. However, it has been considered that the alignment of the liquid crystals 530 is not varied and no refractive power is present in the adjacent electrode non-opposition region N where no electrodes face each other.

For the above reasons, the region N and the region P have different refractive indexes, and the refractive index of the liquid crystal lens 500 has an intermittent quasi-rectangular distribution as shown plainly in FIG. 1B. In other words, as shown in FIG. 1C, the liquid crystal lens 500 corresponds to a Fresnel lens that has a plurality of linear lens surface elements 540. Then, as shown in FIG. 1D, a luminous flux 552 that has passed through the electrode opposition region P forms an image at a focal point 550, whereas a luminous flux 554 that has passed through the electrode non-opposition region N forms no image at the focal point 550, leading to a degraded image forming characteristics.

In practice, refraction occurs even if the alignment of the liquid crystals 530 is not varied (even with a horizontal alignment) since the refractive index is different from that of air. Furthermore, due to the electric fields generated between the electrodes, the alignment not only varies in the electrode opposition region P, but exerts some influence on an expanded region. In particular, due to the latter, the refractive index gradually increases in the electrode non-opposition region N with an increasing distance from the electrode opposition region P, consequently producing a power.

SUMMARY OF THE INVENTION

Accordingly, it is an object of the present invention to provide a variable focal position spatial modulation device which realizes a satisfactory image forming performance.

In order to achieve the above object, according to one aspect of the present invention, there is provided a variable focal position spatial modulation device, comprising: a variable refractive index material that is arranged inside a luminous flux and that is able to deflect an incident light; a plurality of electrode pairs arranged at intervals in one of a concentric shape, a concentric oval shape and an unequally magnified concentric oval shape, in which a pair of electrodes of each of the electrode pairs are generally opposite to each other with interposition of the variable refractive index material between the pair of electrodes; and a voltage supplier for supplying a voltage across the electrodes, in which a refractive index distribution of the variable refractive index material changes in accordance with the voltage supplied across the electrodes, so that a focal position is changed, wherein width of an electrode non-opposition region in which the pair of electrodes do not oppose each other is greater than width of an electrode opposition region in which the pair of electrodes oppose each other, and wherein the refractive index distribution of the variable refractive index material in the electrode non-opposition region is changed by the voltage supplied to the electrode pairs adjacent to each other, so that the focal position is changed.

It is to be noted that the term of "unequal magnified" means an arrangement such that magnification ratios are not identical in orthogonal directions and this arrangement includes, for example, an arrangement such that the magnification ratios differ between the X-direction and the Y-direction and an arrangement such that the magnification ratios are varied by a distance.

If a voltage is applied across each electrode pair by the voltage applying means in the aforementioned construction, then an electric field is generated not only in the electrode opposition region but also in the electrode non-opposition region. The variable refractive index material comes to have a refractive index distribution corresponding to the electric field. The refractive index of the electrode non-opposition region can be easily made to have the desired distribution by a variety of methods as described later. The greater part of the incident luminous flux is incident on the electrode non-opposition region wider than the electrode opposition region and forms an image. Therefore, by controlling the refractive index distribution of the electrode non-opposition region, the image forming performance can be improved.

For example, if the aforementioned construction is applied to a liquid crystal lens, then the flare can be reduced further than in the conventional liquid crystal lens that utilizes only the refractive index variation in the electrode opposition region. This also facilitates the obtainment of refractive index distribution characteristics required for the lens, allowing a variable focal position lens of a satisfactory image forming performance to be constructed.

For example, each of the electrode pairs may be constructed so that one electrode and the other electrode have an identical shape.

According to the above-mentioned construction, an electric field is formed between the electrodes of an identical shape with interposition of the variable refractive index material. Utilizing the expanse of this electric field allows the formation of a refractive index distribution in the electrode non-opposition region where no electrode exists and allows a lens effect to be provided. This facilitates the control of the refractive index distribution and the manufacturing of a variable focal position spatial modulation device.

According to another aspect of the present invention, there is provided a variable focal position spatial modulation device, comprising: a variable refractive index material that is arranged inside a luminous flux and that is able to deflect an incident light; a plurality of electrode pairs arranged at intervals in one of a concentric shape, a concentric oval shape and an unequally magnified concentric oval shape, in which a pair of electrodes of each of the electrode pairs are generally opposite to each other with interposition of the variable refractive index material between the pair of electrodes; and a voltage supplier for supplying a voltage across the electrodes, in which a refractive index distribution of the variable refractive index material changes in accordance with the voltage supplied across the electrodes, so that a focal position is changed, wherein the electrode pairs have the width thereof on one of sides of the variable refractive index material different from the width thereof on the other of sides of the variable refractive index material.

If a voltage is applied across each electrode pair by the voltage applying means in the above-mentioned construction, then an electric field is generated. The variable refractive index material comes to have a refractive index distribution corresponding to this electric field. In each of the electrode pairs, the width of one electrode is different from the width of the other electrode, and the electric field distribution has an expanse. Therefore, the refractive index distribution curve can be provided with a slope. The slope of this refractive index distribution curve is able to have the desired shape by a variety of methods as described later, and this facilitates the formation of a refractive index distribution in which the incident light converges or diverges.

For example, if the aforementioned construction is applied to a liquid crystal lens, then the flare can be reduced further than in the conventional liquid crystal lens that utilizes only the refractive index variation in the electrode opposition region. This also facilitates the obtainment of the refractive index distribution characteristics required for the lens, allowing a variable focal position lens of a satisfactory image forming performance to be constructed.

Therefore, by controlling the refractive index distribution in the portion on which the greater part of luminous flux is incident, the image forming performance can be improved.

Furthermore, according to the aforementioned construction, it is possible to provide not only the convergence characteristic but also the divergence characteristic.

According to still another aspect of the present invention, there is provided a variable focal position spatial modulation device, comprising: a variable refractive index material that is arranged inside a luminous flux and that is able to deflect an incident light; a plurality of electrode pairs arranged at intervals in one of a concentric shape, a concentric oval shape and an unequally magnified concentric oval shape, in which a pair of electrodes of each of the electrode pairs are generally opposite to each other with interposition of the variable refractive index material between the pair of electrodes; and a voltage supplier for supplying a voltage across the electrodes, in which a refractive index distribution of the variable refractive index material changes in accordance with the voltage supplied across the electrodes, so that a focal position is changed, wherein the variable refractive index material is partitioned into a first region including both a first field in which the pair of electrodes of a first electrode pair of the electrode pairs oppose each other and a second field around the first field, and into a second region, adjacent to the first region, including both a third field in which the pair of electrodes of a second electrode pair of the electrode pairs oppose each other and a fourth field around the third field, and wherein there is provided an electric field shield that is arranged between the first region and the second region, thereby reducing the mutual influence of electric fields of the first and second regions exerting on each other.

It is to be noted that the term of "unequal magnified" means an arrangement such that magnification ratios are not identical in orthogonal directions and this arrangement includes, for example, an arrangement such that the magnification ratios differ between the X-direction and the Y-direction and an arrangement such that the magnification ratios are varied by a distance.

If a voltage is applied across each electrode pair by the voltage applying means in the above-mentioned construction, then an electric field is generated. The variable refractive index material comes to have a refractive index distribution corresponding to this electric field. The variable refractive index material is partitioned into each electrode pair, reducing the influence of the electric fields of the adjacent regions in each region. This arrangement facilitates the control of the refractive index of the variable refractive index material and enables the provision of the desired refractive index distribution for improving the image forming performance.

For example, if the aforementioned construction is applied to a liquid crystal lens, then the luminous flux detrimental to the image formation is reduced further than in the conventional type liquid crystal lens that utilizes only the refractive index variation in the electrode region, reducing the flare. This also facilitates the obtainment of refractive index distribution characteristics required for the lens, allowing a variable focal position lens of a satisfactory image forming performance to be constructed.

The arrangement, that the electric field shield material is arranged between the first region and the second region, eliminates the influence of the electric fields of the adjacent regions and facilitates the achievement of the desired refractive index distribution.

According to still another aspect of the present invention, there is provided a variable focal position spatial modulation device, comprising: a variable refractive index material that is arranged inside a luminous flux and that is able to deflect an incident light; a plurality of electrode pairs arranged at intervals in one of a concentric shape, a concentric oval shape and an unequally magnified concentric oval shape, in which a pair of electrodes of each of the electrode pairs are generally opposite to each other with interposition of the variable refractive index material between the pair of electrodes; a voltage supplier for supplying a voltage across the electrodes, in which a refractive index distribution of the variable refractive index material changes in accordance with the voltage supplied across the electrodes, so that a focal position is changed; and an electric field reducing electrode that is provided adjacently to at least one of the pair of electrodes of the each of the electrode pairs and reduces the electric field formed by the at least one thereof, wherein the variable refractive index material is partitioned into a first region including both a first field in which the pair of electrodes of a first electrode pair of the electrode pairs oppose each other and a second field around the first field, and into a second region, adjacent to the first region, including both a third field in which the pair of electrodes of a second electrode pair of the electrode pairs oppose each other and a fourth field around the third field.

It is to be noted that the term of "unequal magnified" means an arrangement such that magnification ratios are not identical in orthogonal directions and this arrangement includes, for example, an arrangement such that the magnification ratios differ between the X-direction and the Y-direction and an arrangement such that the magnification ratios are varied by a distance.

If a voltage is applied across each electrode pair by the voltage applying means in the above-mentioned construction, then an electric field is generated. The variable refractive index material comes to have a refractive index distribution corresponding to this electric field. The variable refractive index material is partitioned into each electrode pair, reducing the influence of the electric fields of the adjacent regions in each region. This arrangement facilitates the control of the refractive index of the variable refractive index material and enables the provision of the desired refractive index distribution for improving the image forming performance.

For example, if the aforementioned construction is applied to a liquid crystal lens, then the luminous flux detrimental to the image formation is reduced further than in the conventional type liquid crystal lens that utilizes only the refractive index variation in the electrode region, reducing the flare. This also facilitates the obtainment of refractive index distribution characteristics required for the lens, allowing a variable focal position lens of a satisfactory image forming performance to be constructed.

By properly applying a voltage to the electric field reducing electrode, the bad influence of the electric fields exerted from the electrode pairs on adjacent regions can be reduced. The electric field reducing electrode can be formed concurrently with the electrode pairs. The variable refractive index material can be separated functionally or electromagnetically even if it is not physically separated into regions.

According to still another aspect of the present invention, there is provided a variable focal position spatial modulation device, comprising: a variable refractive index material that is arranged inside a luminous flux and that is able to deflect an incident light; a plurality of electrode pairs arranged at intervals in one of a concentric shape, a concentric oval shape and an unequally magnified concentric oval shape, in which a pair of electrodes of each of the electrode pairs are generally opposite to each other with interposition of the variable refractive index material between the pair of electrodes; a voltage supplier for supplying a voltage across the electrodes, in which a refractive index distribution of the variable refractive index material changes in accordance with the voltage supplied across the electrodes, so that a focal position is changed; and a light shielding mask for shielding the luminous flux which passes through a portion of the variable refractive index material, in which the portion is other than a portion having a desired refractive index distribution.

If a voltage is applied across each electrode pair by the voltage applying means in the above-mentioned construction, then an electric field is generated. The variable refractive index material comes to have a refractive index distribution corresponding to this electric field.

The luminous flux transmitted through the portion that belongs to the variable refractive index material and is other than the portion of the desired refractive index distribution is a luminous flux that does not contribute to the intended convergence or divergence performance or, for example, a luminous flux that has a convergence or divergence performance converse to the intension or a luminous flux that causes flare. This unnecessary luminous flux is cut off by the light shielding mask. On the other hand, the luminous flux transmitted through the portion that belongs to the variable refractive index material and has the desired refractive index distribution is a luminous flux that contributes to the intended convergence or divergence performance. This luminous flux, which is transmitted through the variable refractive index material without being cut off by the light shielding mask, can be provided with an image forming performance for obtaining one image or a virtual image forming performance. The unnecessary luminous flux is cut off, and therefore, a high image forming performance can be achieved at relatively low cost although the numerical aperture is reduced in terms of performance.

For example, the light shielding mask may shield the luminous flux in the electrode opposition region located between the mutually opposite electrodes of each electrode pair and the luminous flux in an approximately one-half portion on one side of the electrode non-opposition region located between adjacent electrode opposition regions roughly from the center.

If a voltage is applied across each electrode pair, then electric fields are generally formed roughly symmetrically between adjacent electrode pairs. As a consequence of this operation, the refractive index distribution curve of the variable refractive index material becomes roughly symmetrical in a concave shape or a convex shape. The required refractive index distribution curve is one half (one side of the slope) of the shape. The light shielding mask having the above-mentioned construction generally shields the luminous flux transmitted through the electrode opposition region in which no refractive index slope is formed or a small refractive index slope is formed if generated and the luminous flux transmitted through about one half of the electrode non-opposition region that has a refractive index distribution curve of a slope reverse to the desired slope and allows the transmission of only the luminous flux that produces the desired lens performance.

For example, the light shielding mask may be arranged adjacently to one electrode of each electrode pair.

The luminous flux transmitted through the variable refractive index material becomes a convergence or divergence light. Therefore, errors occurring through the manufacturing processes, the influence of the edges of the light shielding mask and so on can be further reduced when the cut-off of the unnecessary luminous flux is restricted on one side.

According to still another aspect of the present invention, there is provided a variable focal position spatial modulation device, comprising: a variable refractive index material that is arranged inside a luminous flux and that is able to deflect an incident light; a plurality of electrode pairs arranged at intervals in one of a concentric shape, a concentric oval shape and an unequally magnified concentric oval shape, in which a pair of electrodes of each of the electrode pairs are generally opposite to each other with interposition of the variable refractive index material between the pair of electrodes; and a voltage supplier for supplying a voltage across the electrodes, in which a refractive index distribution of the variable refractive index material changes in accordance with the voltage supplied across the electrodes, so that a focal position is changed, wherein interval between the electrode pairs adjacent to each other varies, depending upon a distance relative to a center of the device.

It is to be noted that the term of "unequal magnified" means an arrangement such that magnification ratios are not identical in orthogonal directions and this arrangement includes, for example, an arrangement such that the magnification ratios differ between the X-direction and the Y-direction and an arrangement such that the magnification ratios are varied by a distance.

If a voltage is applied across the electrode pairs by the voltage applying means in the aforementioned construction, then an electric field is generated. The variable refractive index material comes to have a refractive index distribution corresponding to this electric field. By changing the intervals between the electrode pairs in the center portion (optical axis center portion) and the peripheral portion of the device, the overall characteristics (for example, the lens aberration performance) of the device can be improved.

For example, the electrode pairs may be arranged according to the characteristics of the variable refractive index material, and this allows the obtainment of a device of the desired characteristics.

That is, if the variable refractive index material has the characteristics that the refractive index thereof becomes smaller as the electric field energy becomes greater, then the electrode pairs are arranged so that the interval becomes narrower as they are located apart from the center of the device or so that the interval becomes wider as they are located apart from the center of the device.

If the interval between the electrode pairs becomes narrower as they are located apart from the center of the device and an approximately equal voltage is applied to the electrode pairs, then the refractive index of the variable refractive index material becomes high in the center portion (optical axis center portion) of the device and becomes low in the peripheral portion of the device, exhibiting a descent apart from the optical axis. Therefore, when obtaining a device of a convergence characteristic, the device comes to have satisfactory convergence.

If the interval between the electrode pairs becomes wider as they are located apart from the center of the device and an approximately equal voltage is applied to the electrode pairs, then the refractive index of the variable refractive index material becomes low in the center portion (optical axis center portion) of the device and becomes high in the peripheral portion of the device, exhibiting an ascent apart from the optical axis. Therefore, when obtaining a device of a divergence characteristic, the device comes to have satisfactory divergence.

If the variable refractive index material has the characteristics that the refractive index thereof becomes greater as the electric field energy becomes greater, then the electrode pairs are arranged so that the interval becomes wider as they are located apart from the center of the device or so that the interval thereof becomes narrower as they are located apart from the center of the device.

If the interval between the electrode pairs becomes wider as they are located apart from the center of the device and an approximately equal voltage is applied to the electrode pairs, then the refractive index of the variable refractive index material becomes high in the center portion (optical axis center portion) of the device and becomes low in the peripheral portion of the device, exhibiting a descent apart from the optical axis. Therefore, when obtaining a device of a convergence characteristic, the device comes to have satisfactory convergence.

If the interval between the electrode pairs becomes narrower as they are located apart from the center of the device and an approximately equal voltage is applied to the electrode pairs, then the refractive index of the variable refractive index material becomes low in the center portion (optical axis center portion) of the device and becomes high in the peripheral portion of the device, exhibiting an ascent apart from the optical axis. Therefore, when obtaining a device of a divergence characteristic, the device comes to have satisfactory divergence.

According to still another aspect of the present invention, there is provided a variable focal position spatial modulation device, comprising: a variable refractive index material that is arranged inside a luminous flux and that is able to deflect an incident light; a plurality of electrode pairs arranged at intervals in one of a concentric shape, a concentric oval shape and an unequally magnified concentric oval shape, in which a pair of electrodes of each of the electrode pairs are generally opposite to each other with interposition of the variable refractive index material between the pair of electrodes; and a voltage supplier for supplying a voltage across the electrodes, in which a refractive index distribution of the variable refractive index material changes in accordance with the voltage supplied across the electrodes, so that a focal position is changed, wherein the voltage supplier supplies different voltages to the electrode pairs, depending on locations of the electrode pairs relative to a center of the device.

If a voltage is applied across the electrode pairs by the voltage applying means in the aforementioned construction, then an electric field is generated. The variable refractive index material comes to have a refractive index distribution corresponding to this electric field. By changing the voltages applied to the electrode pairs in the center portion (optical axis center portion) and the peripheral portion of the device, the overall characteristics (for example, the lens aberration performance) of the device can be improved.

For example, the voltages may be applied to the electrode pairs according to the characteristics of the variable refractive index material, by which the device of the desired characteristics can be obtained.

That is, if the variable refractive index material has the characteristics that the refractive index thereof becomes smaller as the electric field energy becomes greater, then the voltage applying means applies to the electrode pairs a voltage that increases apart from the center of the device or a voltage that reduces apart from the center of the device.

If the voltage that increases apart from the center of the device is applied, then the voltages applied to the electrode pairs become low in the center portion (optical axis center portion) of the device and become high in the peripheral portion of the device. This means that the refractive index of the variable refractive index material exhibits a descent apart from the optical axis. Therefore, when obtaining a device of a convergence characteristic, the device comes to have satisfactory convergence.

If the voltage that reduces apart from the center of the device is applied, then the voltages applied to the electrode pairs become high in the center portion (optical axis center portion) of the device and become low in the peripheral portion of the device. This means that the refractive index of the variable refractive index material exhibits an ascent apart from the optical axis. Therefore, when obtaining a device of a divergence characteristic, the device comes to have satisfactory divergence.

If the variable refractive index material has the characteristics that the refractive index thereof becomes greater as the electric field energy becomes greater, then the voltage applying means applies to the electrode pairs a voltage that reduces apart from the center of the device or a voltage that increases apart from the center of the device.

If the voltage that reduces apart from the center of the device is applied to the electrode pairs, then the voltage becomes high in the center portion (optical axis center portion) of the device and becomes low in the peripheral portion of the device. This means that the refractive index of the variable refractive index material exhibits a descent apart from the optical axis. Therefore, when obtaining a device of a convergence characteristic, the device comes to have satisfactory convergence.

If the voltage that increases apart from the center of the device is applied to the electrode pairs, then the voltage becomes low in the center portion (optical axis center portion) of the device and becomes high in the peripheral portion of the device. This means that the refractive index of the variable refractive index material exhibits an ascent apart from the optical axis. Therefore, when obtaining a device of a divergence characteristic, the device comes to have satisfactory divergence.

Specifically, the present invention provides a liquid crystal lens of a satisfactory image forming performance by utilizing the refractive index distribution that gradually varies between the ring-shaped electrodes, eliminating the influence of the flare and eliminating an image forming nonuniformity due to refractive power quantization instead of utilizing the approximately constant refractive index between the electrodes with interposition of, for example, liquid crystals.

That is, in contrast to the fact that the conventional Fresnel lens is, for example, a group of prisms whose prism elements are constructed of flat surfaces, the present invention provides a Fresnel lens of a group of lenses whose prism elements are constructed of lens spherical surfaces.

It can also be said that the present invention materializes a refractive index distribution lens (GRIN lens) with liquid crystals so as to provide a lens whose refractive index distribution structure resembles the Fresnel lens.

The present invention can be used in, for example, the fields as follows.

The present invention has a field of use in executing sensing by utilizing a luminous flux that has passed through the pupil of an object lens on which the light from the subject is incident. It is assumed that the device is, for example, a camera and the sensing is focus detection.

Specifically, when obtaining a focal position by utilizing an imaging area sensor of a digital camera, the maximum contrast position is obtained in, for example, a contrast system, and the focus lens of the imaging lens is moved to obtain the peak position of the output curve of contrast detection for the obtainment of a focus.

There can be provided another method for obtaining the focal position without moving the focus lens. Two imaging sensors are arranged while being displaced in the optical axis direction of the imaging lens, and their contrast outputs are compared with each other to estimate the focal position. In this case, the focal position is roughly estimated by interpolating (through an extrapolating or interpolating operation) a difference between the two output values. In this case, the operation can be or cannot be executed depending on the amount of defocus in the initial position of the lens. If the amount of defocus is large in this stage, then the focal position can be easily found when a displacement between the positions of the two sensors in the optical axis direction (amount of focus displacement) is large. When the amount of defocus is small, the displacement between the positions of the two sensors in the optical axis direction (amount of focus displacement) should preferably be set small in order to increase the focus position detection accuracy. In the case of a very large amount of defocus, the two sensors should preferably be separated wide apart in the optical axis direction. When a focus is about to be obtained, the distance between the sensors should preferably be reduced for an increase in the final focus position determination (or "AF (auto-focus) completion") accuracy. It can be said that a rapid AF operation can be achieved even in the case of a very large amount of defocus.

Therefore, in contrast to the fact that much time has been consumed for AF in the conventional contrast system, the present invention can achieve rapid AF.

In addition, there is an increased number of manageable types when executing sensing by means of object lenses of different pupil diameters. That is, the sensing that has had the problem of shading due to the exit pupil is allowed to have an increased range of sensing since the luminous flux can be changed according to the pupil position.

Therefore, in contrast to the conventional disadvantage that focus detection has been able to be achieved only with, for example, a lens having an F value corresponding to bright light, the present invention enables the execution of AF even with a lens corresponding to dark light.

In contrast to the conventional disadvantage that the accuracy has been reduced since the focus sensing has been designed so as to be detected only with a luminous flux in a dark region of the F value, the present invention enables the achievement of high-accuracy AF.

Furthermore, if the present invention is applied to the focus lens of an imaging lens, then focus control can be performed. In contrast to the conventional practice that the imaging lens has been required to be increased in size due to the need for moving the glass lens by a considerable quantity in the optical axis direction in focusing, the present invention enables the obtainment of a compact imaging lens.

In contrast to the conventional practice that the lens itself has been required to be replaced or one lens or a plurality of lenses have been required to be moved in order to obtain the required focal position in the general optical system design phase, the present invention enables the simpler construction of a compact optical system.

Although only the convergence lens characteristics have been mentioned according to the proposal of the conventional liquid crystal lens, the present invention can be applied to a divergence lens. An arbitrary refractive index distribution can be obtained by controlling the rate of change in the refractive index of the liquid crystals by the electrode width, and this also allows divergence lens (concave lens) characteristics to be provided.

BRIEF DESCRIPTION OF THE DRAWINGS

This and other objects and features of the present invention will become clear from the following description taken in connection with the preferred embodiments thereof with the reference to the accompanying drawings, in which.

DETAILED DESCRIPTION OF THE PREFERRED EMBODIMENTS

Figure 1A:
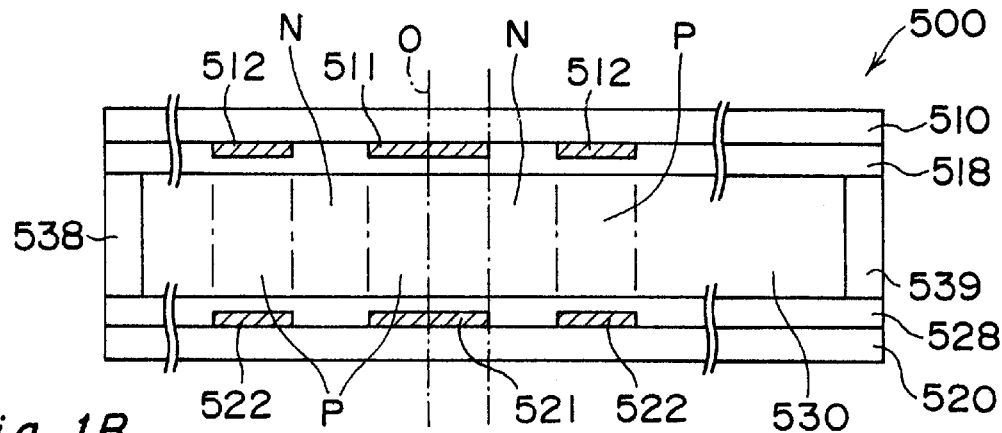
FIGS. 1A through 1D are explanatory views of a conventional liquid crystal lens.
Figure 1B:
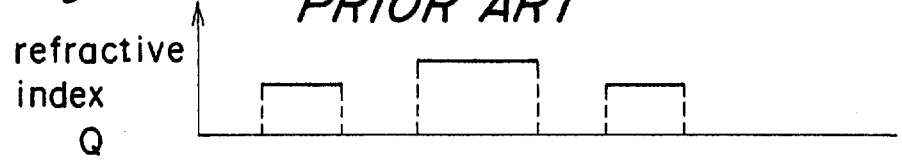
Figure 1C:
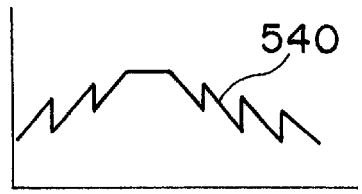
Figure 1D:
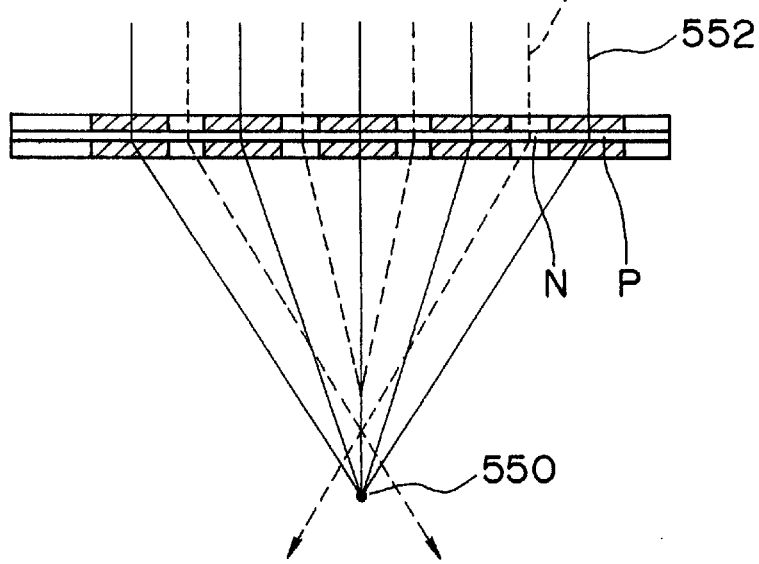

Before the description of the preferred embodiments of the present invention proceeds, it is to be noted that like or corresponding parts are designated by like reference numerals throughout the accompanying drawings.

Reffering to FIGS. 2–18, full description is made on liquid crystal lenses according to the first to eleventh embodiments of the present invention.

First, the liquid crystal lens according to the first embodiment of the present invention is explained with reference to FIGS. 2–4.

Figure 3A:
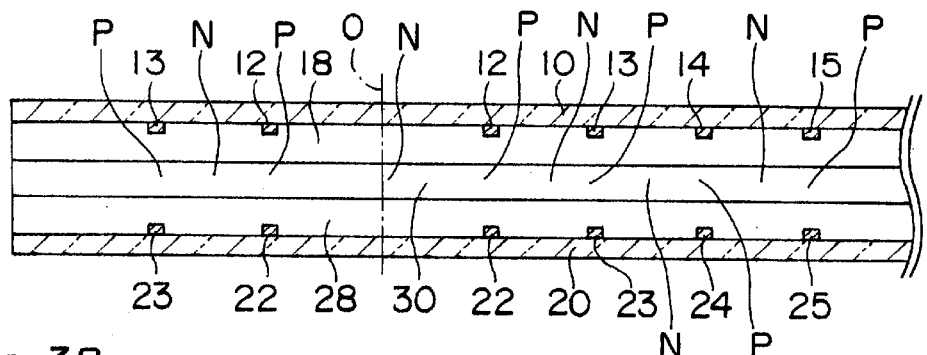
FIGS. 3A and 3B are explanatory views of a basic construction of the liquid crystal lens used in the embodiments.
Figure 3B:
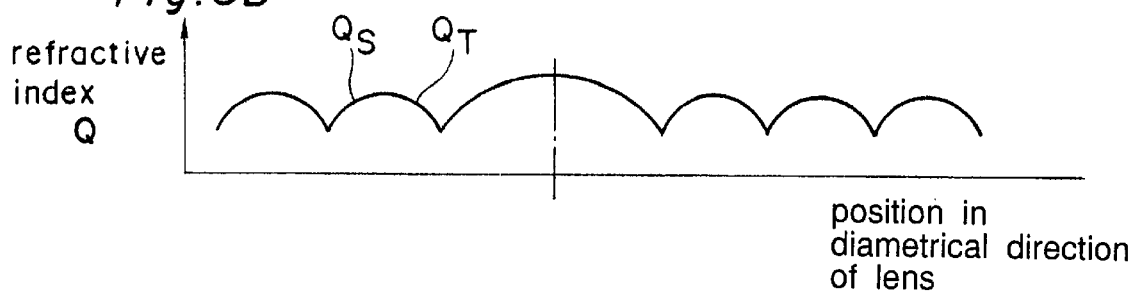

In contrast to the conventional practice that the refractive index in the electrode opposition region P has been controlled for image formation, the preferred embodiments of the present invention have improved image forming characteristics by controlling the refractive index in the electrode non-opposition region N, as shown in FIGS. 3A and 3B. FIGS. 3A and 3B show a basic construction of the embodiments, which have substrates 10 and 20, alignment films 18 and 28, liquid crystals 30, electrodes 12–15 and electrodes 22–25. In the construction, the refractive index has a distribution as shown in the sectional view of FIG. 3B where humps repetitively occur.

FIGS. 2A through 2D show more specific construction. In the figures are shown substrates 10 and 20, alignment films 18 and 28, liquid crystals 30, seal members 38 and 39, an optical axis O and a direction of incident luminous flux L.

Figure 2A:
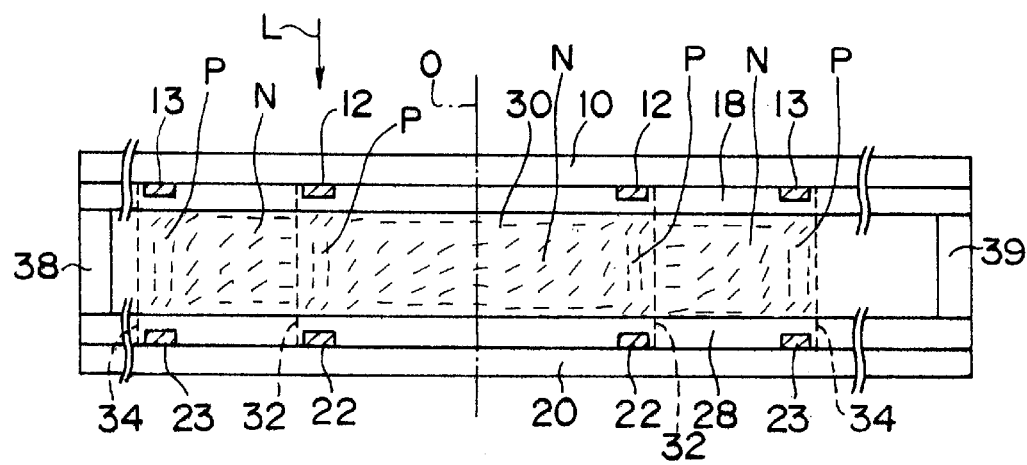
FIGS. 2A through 2D are explanatory views of a liquid crystal lens according to a first embodiment of the present invention.
Figure 2B:
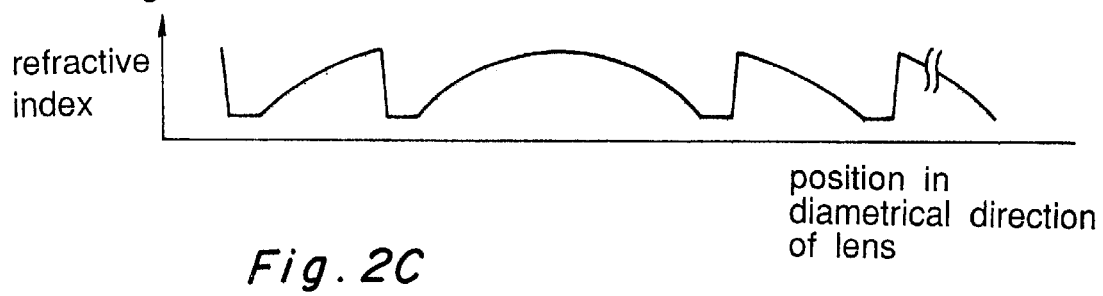
Figure 2C:
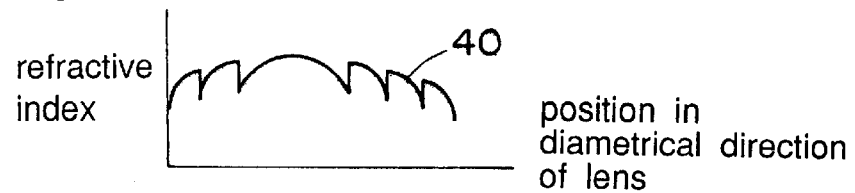
Figure 2D:
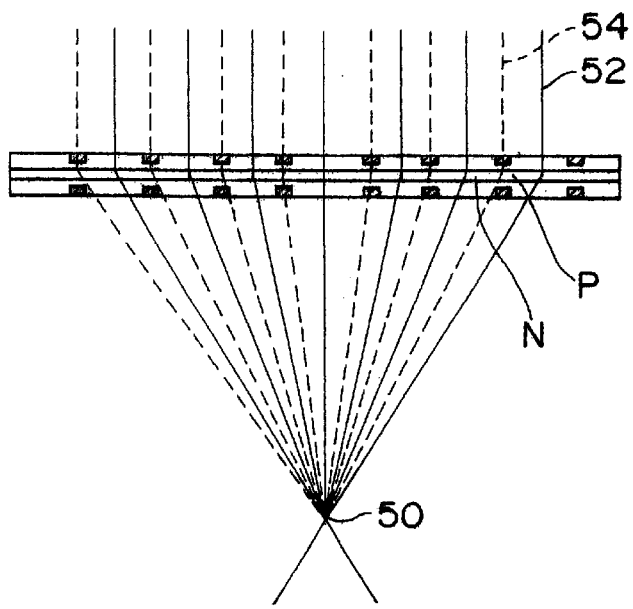

That is, as shown in the schematic sectional view of FIG. 2A, the widths of the electrodes 12 and 13 and the electrodes 22 and 23 formed in a concentric ring shape on the substrates 10 and 20 are respectively each made smaller than the width of the electrode non-opposition region N. Further, electric field shielding sections 32 and 34 are provided for partitioning the lens into ring-shaped cells. With this arrangement, as shown in FIG. 2B, the refractive index is varied with the desired slope in the electrode non-opposition region N. As shown in FIG. 2C, this refractive index distribution corresponds to a Fresnel lens that has a plurality of curved lens surface elements 40. Then, as shown in FIG. 2D, the image forming characteristics can be improved by making the greater part of a luminous flux 54 pass through the electrode non-opposition region N and form an image at a focal point 50. It is also possible to further improve the image forming characteristics by making a luminous flux 52 that passes through the electrode opposition region P form an image at the focal point 50.

Liquid crystal lenses, according to preferred embodiments of the present invention, can be concretely constructed in various forms as follows.

Figure 4A:
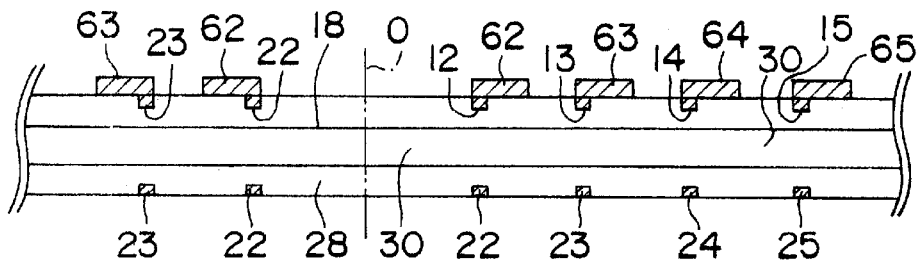
FIGS. 4A and 4B are explanatory views of the liquid crystal lens according to the first embodiment of the present invention.
Figure 4B:
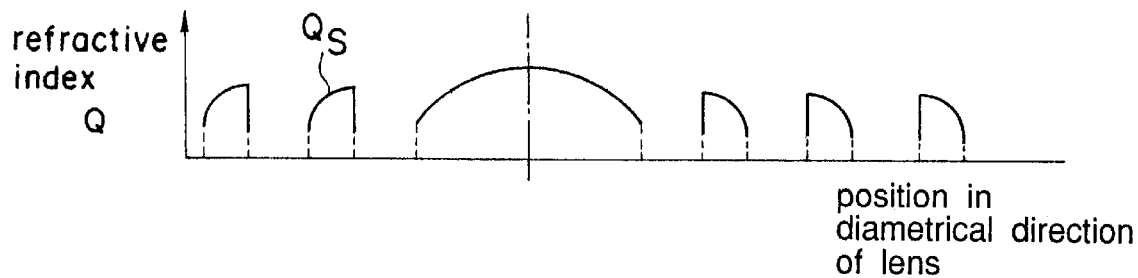

The sectional view of the essential part in FIG. 4A shows a construction provided with light shielding sections 62 through 65 for cutting off the unnecessary luminous flux. In this construction, the light shielding sections 62 through 65 shield the luminous flux that passes through a portion corresponding to a range QT (see FIG. 3B) where no contribution is added to the image forming performance within a refractive index distribution curve and allows only the luminous flux to pass only through a portion corresponding to a range $Q_S$ where a contribution is made. The light shielding sections 62 through 65 can easily be formed by forming, for example, an opaque film. However, according to this method, one side of the hump-shaped refractive index distribution curve is to be cut off as shown in FIG. 4B. Therefore, the total quantity of light is reduced to approximately one half.

FIGS. 4A and 4B show a convergence system lens (convex lens). In the case of a divergence system lens (concave lens), the portion QT that belongs to the refractive index distribution curve and has not been utilized is to be used. Therefore, a portion inverse to FIG. 4A (portion through which light is transmitted) is to be masked.

Next, the liquid crystal lens according to the second embodiment of the present invention is explained with reference to FIGS. 5A, 5B, 7A, and 7B.

In another construction, the lens is partitioned into cells to widen the effective region.

Figure 5A:
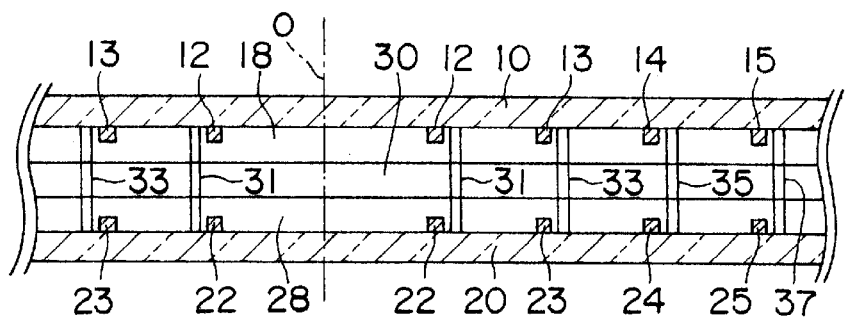
FIGS. 5A and 5B are explanatory views of a liquid crystal lens according to a second embodiment of the present invention.
Figure 5B:
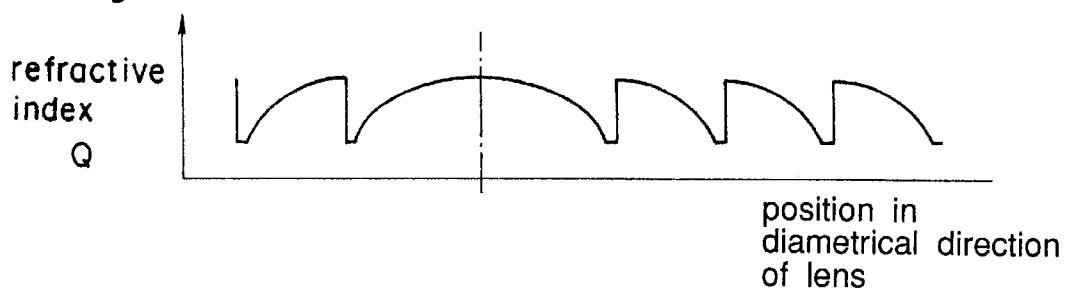
Figure 6A:
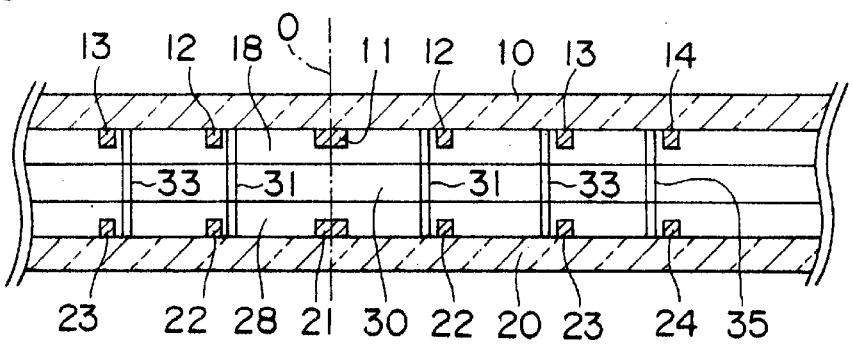
FIGS. 6A and 6B are explanatory views of a liquid crystal lens according to a ninth embodiment of the present invention.
Figure 6B:
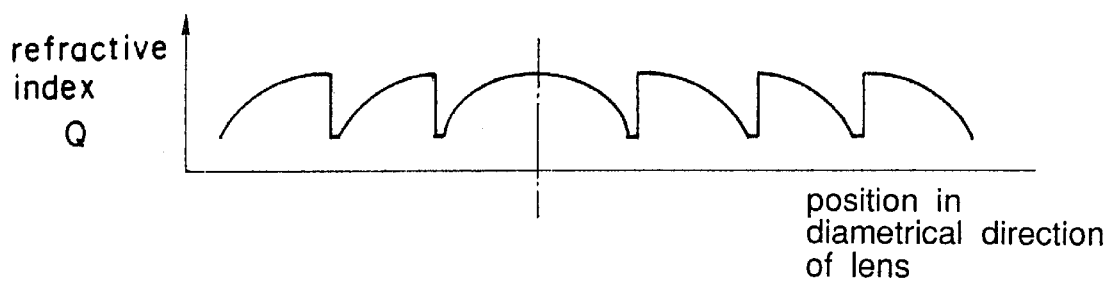

FIGS. 5A and 5B are views of a construction in which the lens is partitioned into cells by electric field shields 31, 33, 35 and 37. The electric field shields 31, 33, 35 and 37 are made of copper or a material (indium oxide, tin oxide, ITO, i.e., indium tin oxide or the like) to be used for a transparent electrode.

Figure 7A:
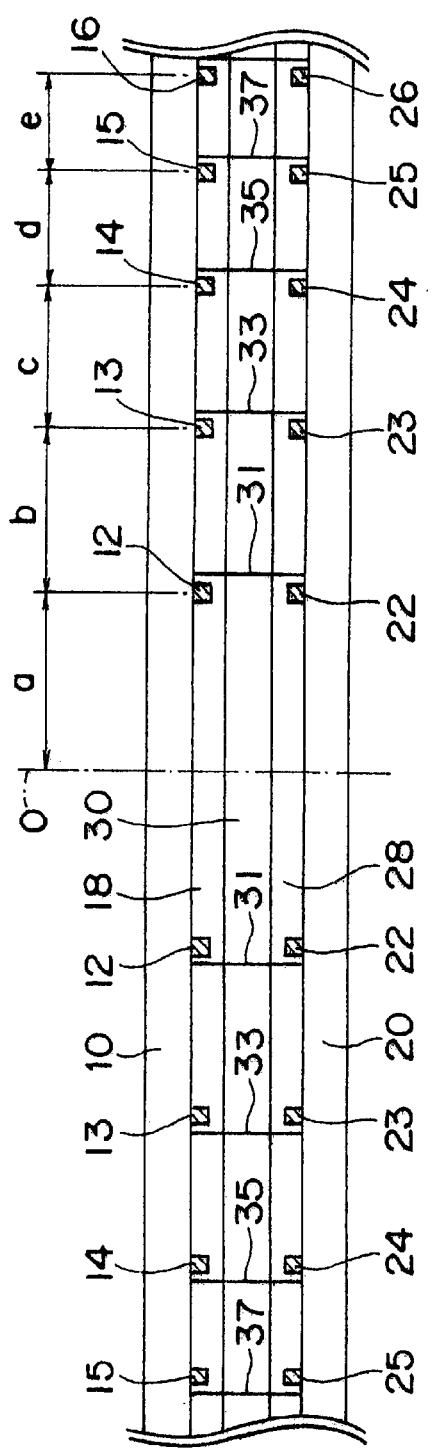
FIGS. 7A and 7B are explanatory views of the liquid crystal lens according to the second embodiment of the present invention.

As shown in FIG. 7A, the desired refractive index distribution can be obtained by varying the intervals between electrodes.

Figure 7B:
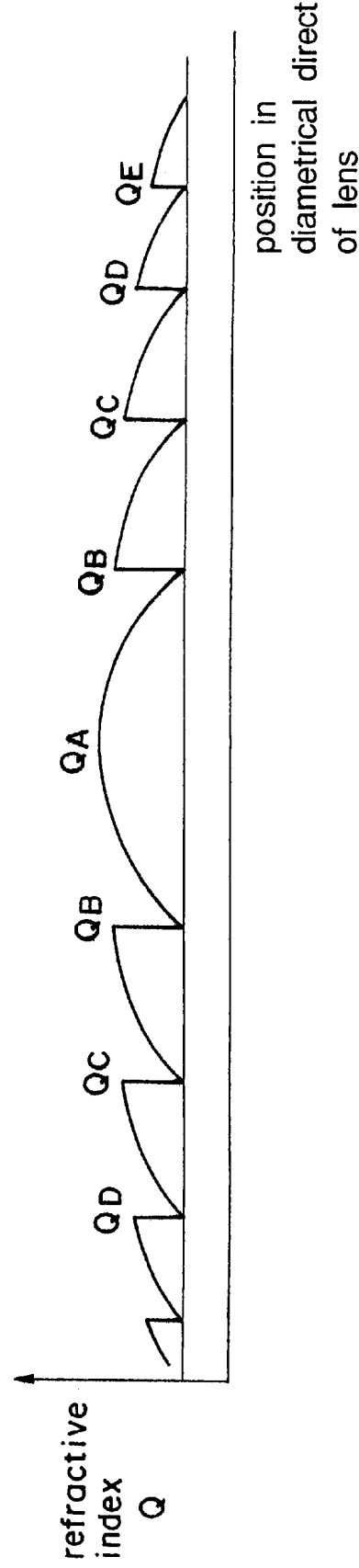

That is, by widening the intervals between electrodes near the center of the optical axis O and narrowing the interval between electrodes in the peripheral portion of the optical axis O, differences are provided in the refractive index distribution between the cells as shown in FIG. 7B.

In order to provide a refractive index distribution having a close resemblance to the shape of the so-called Fresnel zone plate, if the symbols in FIGS. 7A and 7B are used, then there hold the expression (1):

$$a > b > c > d > e$$

with regard to the widths of the cells and the expression (2):

$$Q_A > Q_B > Q_C > Q_D > Q_E$$

with regard to the maximum refractive indexes of the cells.

In this case, an identical voltage can be applied to the electrodes 12 through 16 and 22 through 26.

It is possible to eliminate the luminous flux deflecting in the direction opposite to the desired direction and improve the transmittance with the partitioning of individual cells. It is also possible to improve the refractive index distribution characteristic in the electrode non-opposition region and improve the lens effect (image forming performance). It is also possible to set an aspherical surface lens effect.

Next, the liquid crystal lens according to the third embodiment of the present invention is explained with reference to FIGS. 8, 9A, and 9B.

Figure 8:
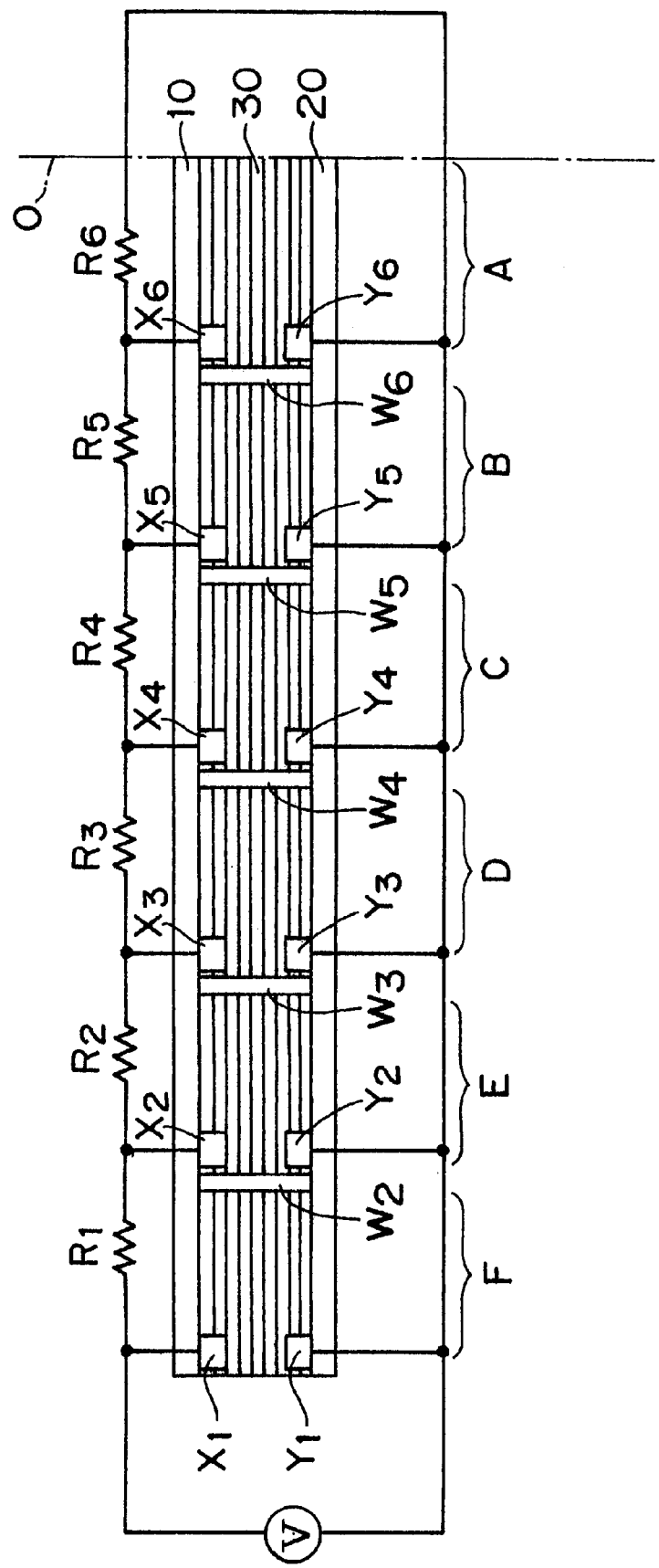
FIG. 8 is an explanatory view of a liquid crystal lens according to a third embodiment of the present invention.
Figure 9:
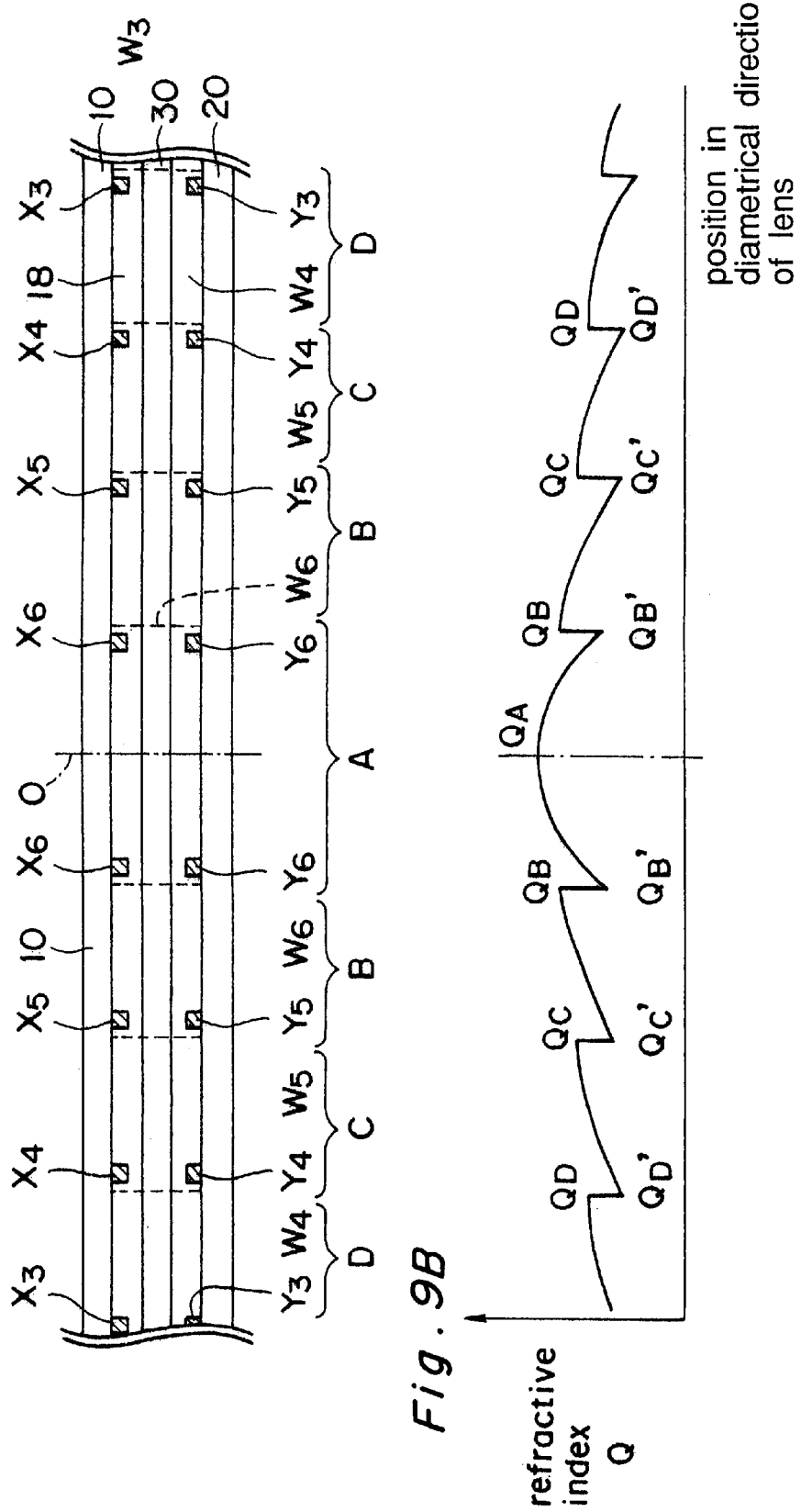
FIGS. 9A and 9B are explanatory views of the liquid crystal lens according to the third embodiment of the present invention.

As shown in FIG. 8, it is also possible to obtain the desired refractive index distribution by varying the voltage applied to the electrodes.

In FIG. 8, the total power is controlled by changing in steps the voltages to be applied to the electrodes $X_1$ through $X_6$ of the cells A through F by means of resistors $R_1$ through $R_6$ so that the maximum voltages VA through VF of the cells A through F have the relation (3):

$$V_F > V_E > V_D > V_C > V_B > V_A.$$

A power source V is provided by, for example, an AC drive voltage of 5 V at a frequency of 1 kHz. In this case, it is required to provide synchronized light-receiving means. The synchronization is not needed in the case of a material capable of maintaining a constant refractive index with a DC power source.

In this case, by providing a low voltage in the center portion of the optical axis O and a high voltage in the peripheral portion of the optical axis O, as shown in FIGS. 9A and 9B, the liquid crystals 30 located in the vicinity of the center portion are brought in a state close to the horizontal alignment, i.e., made to have a high refractive index, while the liquid crystals 30 located in the vicinity of the peripheral portion can be brought in a deeply aligned state, i.e., made to have a low refractive index, producing a refractive index distribution effect as observed in a Fresnel lens.

That is, using the symbols in FIG. 9A, the refractive index distributions of the cells A through D can be set so as to be expressed by the expression (4):

$$Q_A > Q_B > Q_C > Q_D$$

and the expression (5):

$$Q_{B'} > Q_{C'} > Q_{D'}.$$

An aspherical surface effect can also be added to allow the lens performance to be improved.

The cells are allowed to have various constructions as shown in FIG. 10 through FIG. 14.

Next, the liquid crystal lens according to the fourth embodiment of the present invention is explained with reference to FIG. 10.

Figure 10:
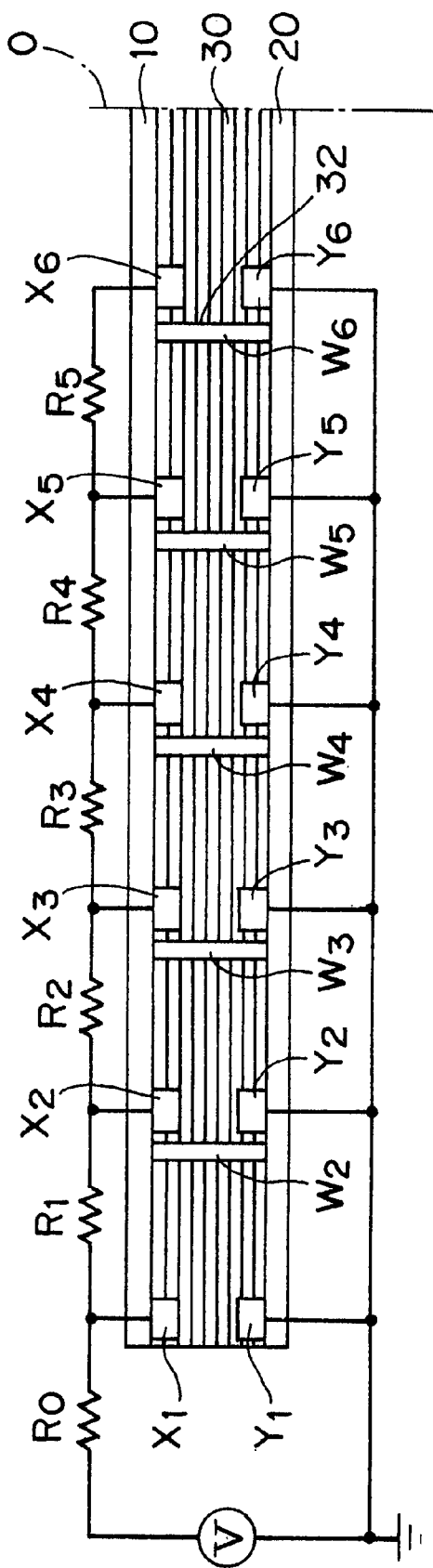
FIG. 10 is an explanatory view of a liquid crystal lens according to a fourth embodiment of the present invention.

FIG. 10 shows a construction in which the liquid crystal cells are definitely partitioned into ring-shaped cells by walls $W_2$ through $W_6$ arranged in a concentric cylindrical shape. The refractive power can be set high by the partitioning of the walls $W_2$ through $W_6$ made of an electromagnetic shield material for the prevention of the influence of the electrodes of the adjacent cells. It is to be noted that this construction is effective when the light enters the liquid crystal cells at an angle almost perpendicular to a plane of incidence thereof, and if the light tilts relative to the plane thereof, then the walls $W_2$ through $W_6$ for partitioning use shield the optical path.

Next, the liquid crystal lens according to the fifth embodiment of the present invention is explained with reference to FIG. 11.

Figure 11:
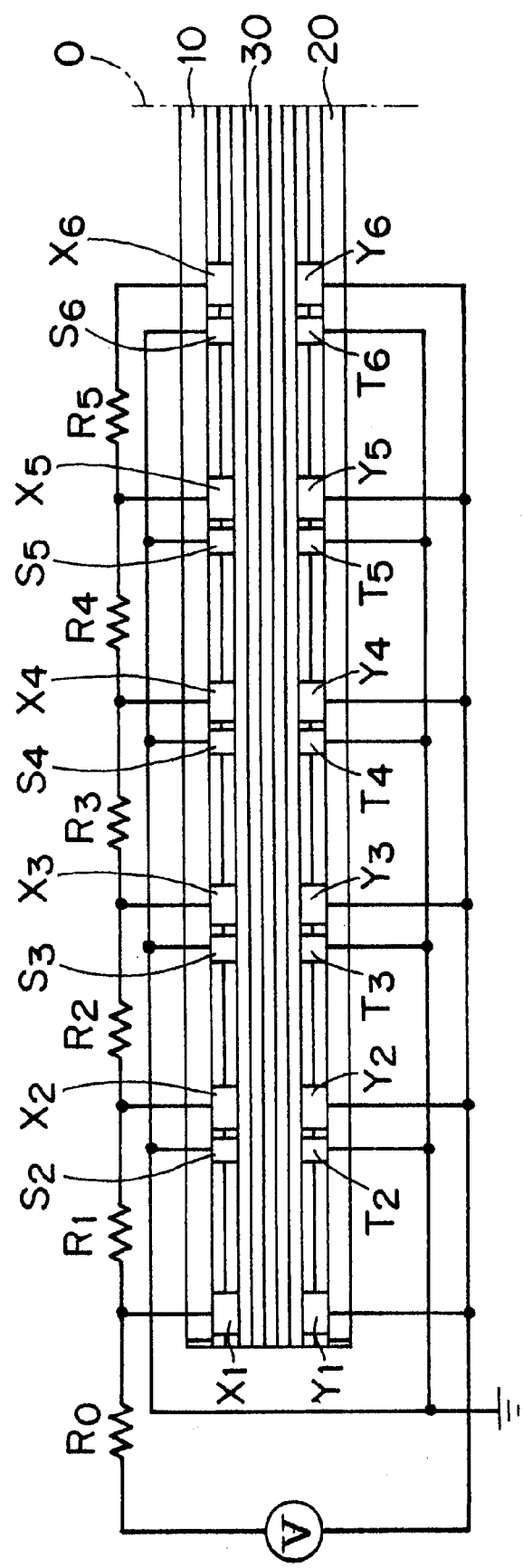
FIG. 11 is an explanatory view of a liquid crystal lens according to a fifth embodiment of the present invention.

In the construction of FIG. 11, ground electrodes $S_2$ through $S_6$ and $T_2$ through $T_6$ are set in the vicinity of the electrodes $X_2$ through $X_6$ and $Y_2$ through $Y_6$ in order to set high the refractive powers of the cells. This construction has the effect of eliminating the influence of the adjacent cells. Due to control from the ground, a wide range of potential difference control and reliable setting can be achieved.

Next, the liquid crystal lens according to the sixth embodiment of the present invention is explained with reference to FIG. 12.

Figure 12:
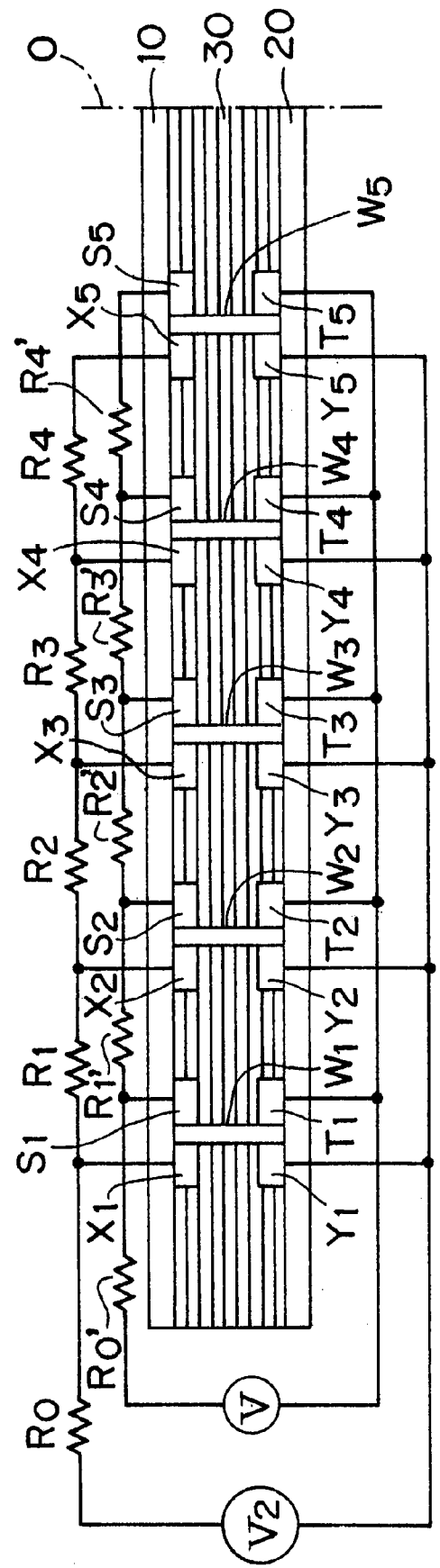
FIG. 12 is an explanatory view of a liquid crystal lens according to a sixth embodiment of the present invention.

FIG. 12 shows a construction in which walls $W_1$ through $W_6$ for definite partitioning of the cells are set and a pair of electrodes $S_i$ and $T_i$ and a pair of electrodes $X_i$ and $Y_i$ are arranged on both sides of each wall $W_i$. The application voltage enables the suppression of the outer and inner portions of the ring-shaped cells by V and V2, the fine control of the electric field distribution and the expansion of the effective region of optical path deflection.

Next, the liquid crystal lens according to the seventh embodiment of the present invention is explained with reference to FIG. 13.

Figure 13:
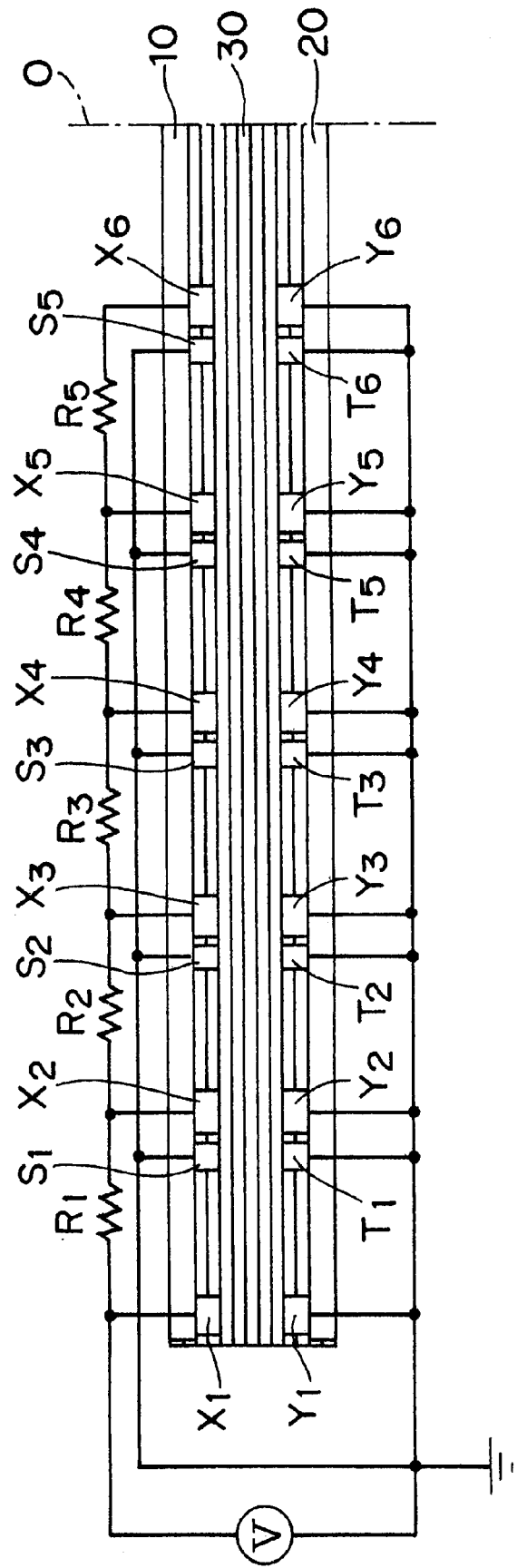
FIG. 13 is an explanatory view of a liquid crystal lens according to a seventh embodiment of the present invention.

In FIG. 13, the cells themselves have the same construction as that of FIG. 11. However, dissimilar to FIG. 11, the electrodes $Y_1$ through $Y_6$ are also grounded. The voltage V is varied by a microcomputer.

Next, the liquid crystal lens according to the eighth embodiment of the present invention is explained with reference to FIG. 14.

Figure 14:
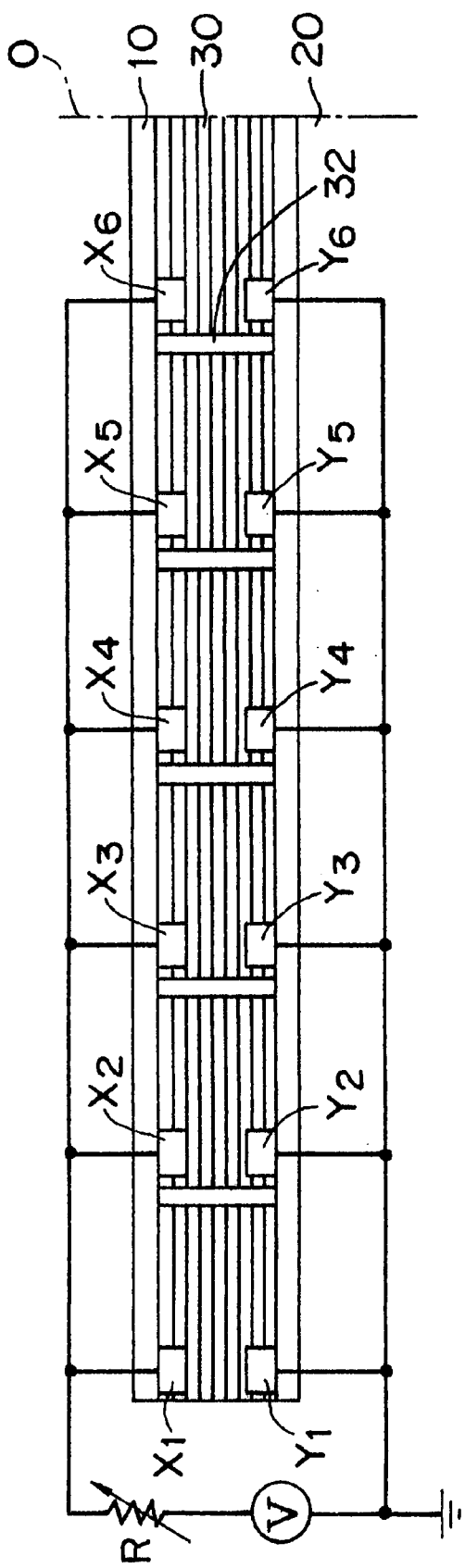
FIG. 14 is an explanatory view of a liquid crystal lens according to a eighth embodiment of the present invention.

In FIG. 14, the cells themselves have the same construction as that of FIG. 10. However, dissimilar to FIG. 11, an identical voltage is applied to the electrodes, and its magnitude can be varied by a variable resistor R.

Next, the liquid crystal lens according to the ninth embodiment of the present invention is explained with reference to FIGS. 6A, 6B, 15A, and 15B.

Figure 15A:
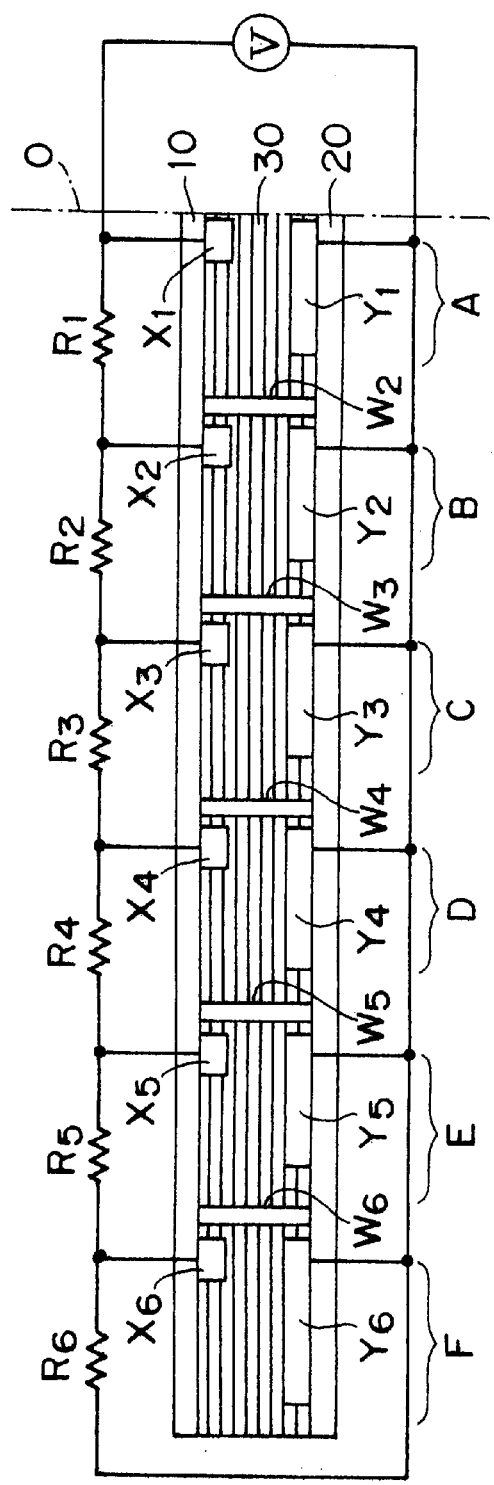
FIGS. 15A and 15B are explanatory views of the liquid crystal lens according to the ninth embodiment of the present invention.
Figure 15B:
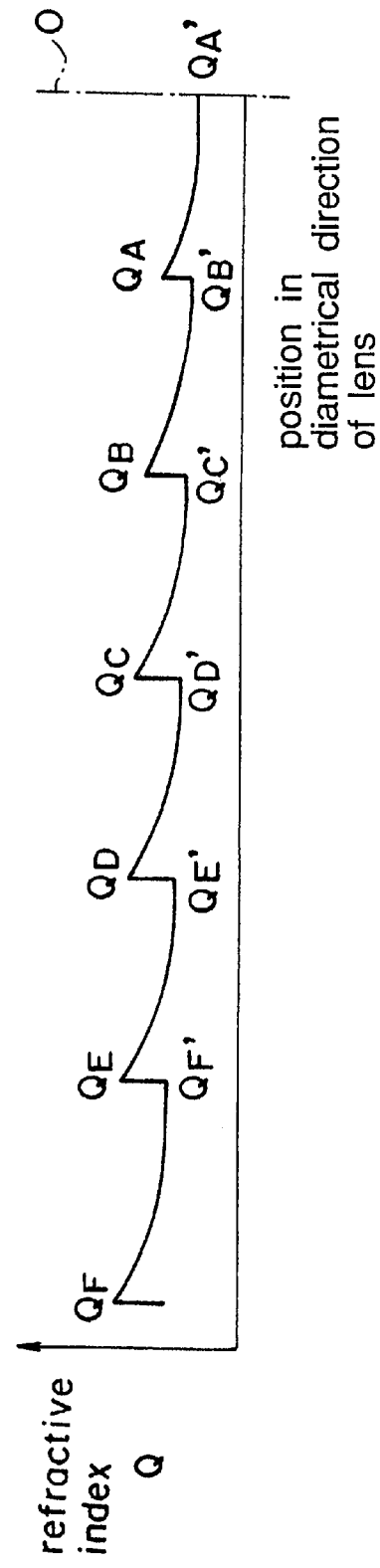

FIGS. 15A and 15B show an example of a concave lens.

In order to provide a concave lens structure, the walls $W_2$ through $W_6$ for shielding the electric fields, the electrodes $X_1$ through $X_6$ and $Y_1$ through $Y_6$ are arranged in position reverse to those of the convex lens system, and the voltage arrangement is also reversed in terms of magnitude.

That is, by providing a high voltage in the vicinity of the center portion of the optical axis O and a low voltage in the vicinity of the peripheral portion of the optical axis O, as shown in FIG. 15B, the lens is allowed to have a concave refractive index distribution curve, a low refractive index in the vicinity of the center portion and a high refractive index in the vicinity of the peripheral portion, by which a refractive index distribution effect of a convex lens can be produced.

That is, using the symbols in the figure, the refractive index distribution of the cells A through F is expressed by the expression (6):

$$Q_F > Q_E > Q_D > Q_C > Q_B > Q_A$$

and the expression (7):

$$Q_{F'} > Q_{E'} > Q_{D'} > Q_{C'} > Q_{B'} > Q_{A'}.$$

Whether the refractive index curve is of the concave system or the convex system can be determined by a width dimension ratio of the mutually opposite electrodes $X_i$ and $Y_i$ (i=1, 2, . . . ). In FIGS. 15A and 15B, the characteristic of the concave lens (divergence lens) system is provided by setting wide the electrode $Y_i$ (i=1, 2, . . . ) for the achievement of a gently-sloping rise of refractive index. If the mutually opposite electrodes $X_i$ and $Y_i$ (i=1, 2, . . . ) have an identical width, then the characteristic of the convex lens (convergence lens) is to be provided, as described hereinbefore. This characteristic is determined in the design phase.

The nematic liquid crystals having the positive dielectric anisotropy are employed as the liquid crystal material according to the above description. However, a transparent solid or liquid material whose refractive index is varied when an electric field is applied may be employed.

A material (for example, $BaTiO_3$, $KH_2PO_4$ (KHP), $KD_2PO_4$ (KDP), $LiNbO_3$ or ZnO) producing the Pockels effect that the refractive index variation is proportional to the intensity of the electric field or a material (for example, $CS_2$) utilizing the Kerr effect that the refractive index variation is proportional to the square of the electric field may be employed.

Depending on the material, the application voltage distributions in the vicinity of the center portion of the optical axis and in the vicinity of the peripheral portion may have a relation of a reversed arrangement.

That is, although the embodiments in which the refractive index becomes smaller as the electric field energy becomes greater and the refractive index becomes greater as the electric field energy becomes smaller have been described in connection with the characteristics of the material to be employed, there may be a reverse case. In such a case, as shown in, for example, FIGS. 6A and 6B, the relations between the electrodes 11 through 14 and 21 through 24 and the electric field shields 32 through 34 become reverse to those of FIGS. 5A and 5B.

Figure 16:
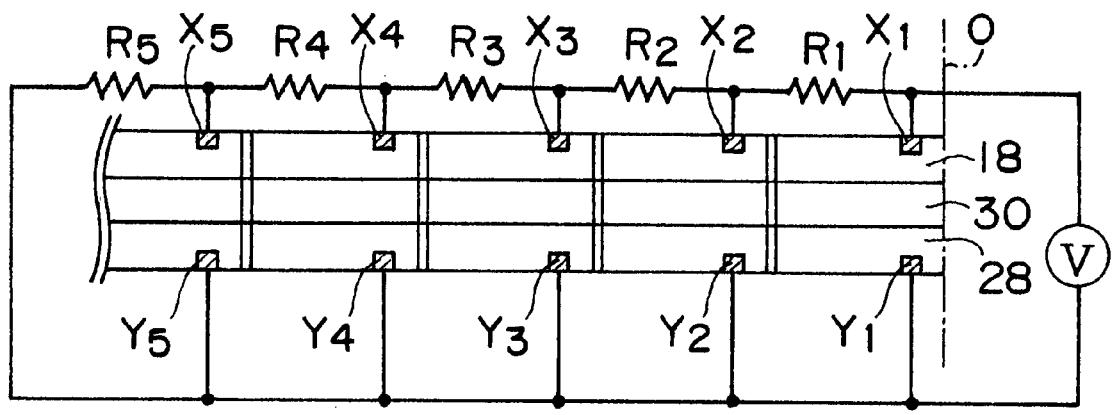
FIG. 16 is an explanatory view of a liquid crystal lens according to a tenth embodiment of the present invention.

Next, the liquid crystal lens according to the tenth embodiment of the present invention is explained with reference to FIG. 16.

By providing a high voltage in the center portion of the optical axis and a low voltage in the peripheral portion, the lens characteristics can also be improved. In this case, there is a structure as shown in, for example, FIG. 16.

TABLE 1, below, collects the features according to the material characteristics and the use purposes. In this table, the number (1) is relevant to the case where the application voltage is constant and control is effected only by the intervals between electrodes, while the number (2) is relevant to the case where the voltage is varied to improve the lens characteristics.

TABLE 1

|  | Used for Convergence | Used for Divergence |
|---|---|---|
| Electric Field Energy is Large and Material Refractive Index is Small | (1) Center Space is Wide and Periphery is Narrow (2) Voltage is Low at Center and High in Periphery | (1) Center Space is Narrow and Periphery is Wide (2) Voltage is High at Center and Low in Periphery |
| Electric Field Energy is Large and Material Refractive Index is Large | (1) Center Space is Narrow and Periphery is Wide (2) Voltage is High at Center and Low in Periphery | (1) Center Space is Wide and Periphery is Narrow (2) Voltage is High at Center and High in Periphery |

In order to improve the convex lens characteristics, the refractive index of the peripheral portion is intended to be brought in a low state. In the case of the concave lens, the refractive index of the peripheral portion is intended to be brought in a high state.

The liquid crystal lenses of the aforementioned embodiments can each be a liquid crystal lens of a satisfactory image forming performance by controlling the refractive index of the liquid crystals.

It is to be noted that the present invention is not limited to the aforementioned embodiments and is able to be materialized in a variety of forms.

Figure 17:
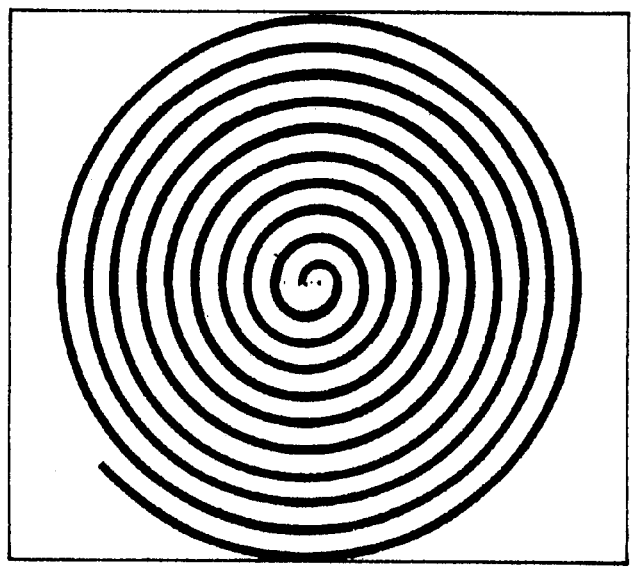
FIG. 17 is an explanatory view of a liquid crystal lens according to a eleventh embodiment of the present invention.

Next, the liquid crystal lens according to the eleventh embodiment of the present invention is explained with reference to FIG. 17.

For example, the electrodes are arranged in a concentric ring shape in the embodiments that have been described. Therefore, the wiring of the electrodes is required to be provided in a multi-layer construction. However, in order to reduce the cost, the wiring layers can be reduced in number by employing a spiral electrode as shown in FIG. 17. In this case, the wiring is easier than in the case of the concentric electrodes.

Figure 18A:
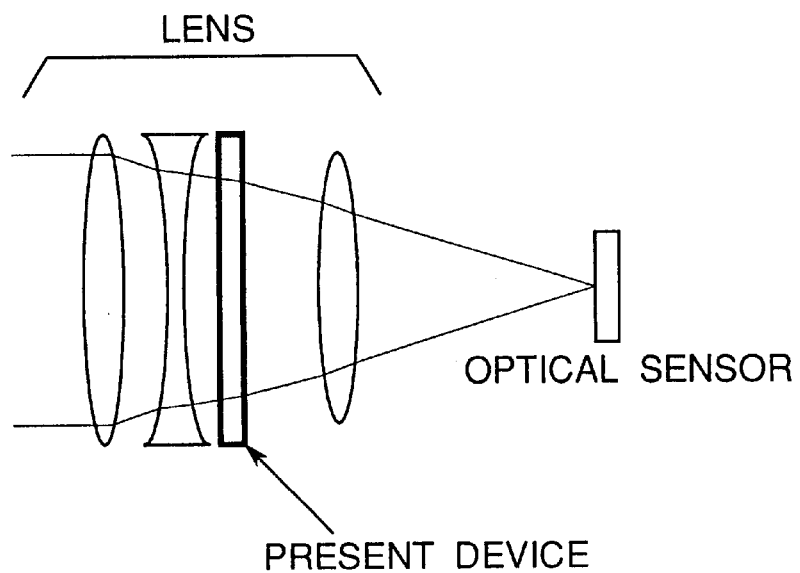
FIGS. 18A and 18B are explanatory views of a method for using the device of the preferred embodiment.
Figure 18B:
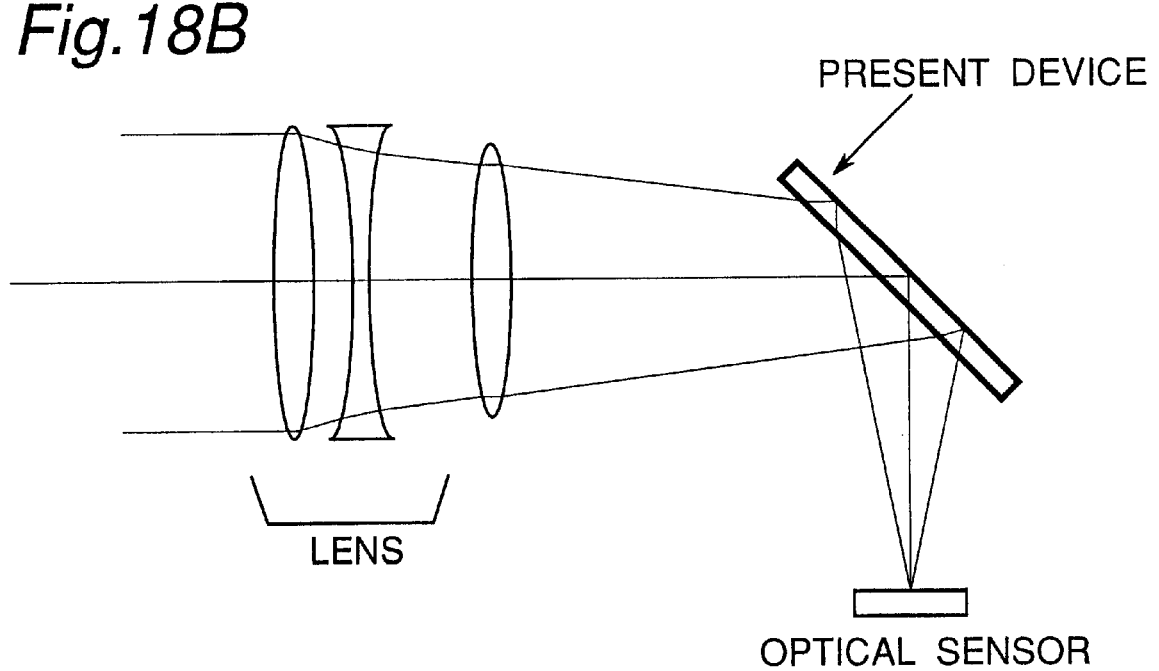

The device of the present invention is utilized by being arranged in the luminous flux of an optical lens as shown in, for example, FIGS. 18A and 18B. The device may be employed as a device through which the luminous flux is transmitted as shown in FIG. 18A or as a device for reflecting the luminous flux with a reflecting surface provided on the side opposite to the incident surface as shown in FIG. 18B.

As an embodiment, the variable refractive index material may be provided by liquid crystals.

The liquid crystals can obtain a refractive index distribution corresponding to an electric field and are able to be easily manufactured. Therefore, a liquid crystal lens or the like can be easily constructed.

As another embodiment, the variable refractive index material may be a Pockels effect material or a Kerr effect material.

That is, the Pockels effect material that is a material whose refractive index is proportional to the intensity of the electric field and the Kerr effect material that is a material whose refractive index is proportional to the square of the intensity of the electric field are appropriate for a construction for obtaining the desired refractive index distribution.

Although the present invention has been fully described in connection with the preferred embodiments thereof with reference to the accompanying drawings, it is to be noted that various changes and modifications are also apparent to those skilled in the art. Such changes and modifications are to be understood as included within the scope of the present invention as defined by the appended claims unless they depart therefrom.

What is claimed is:

1. A variable focal position spatial modulation device comprising:

a variable refractive index material that is arranged inside a luminous flux and that is able to deflect an incident light;

a plurality of electrode pairs arranged at intervals in one of a concentric shape, a concentric oval shape and an unequally magnified concentric oval shape, in which a pair of electrodes of each of the electrode pairs are generally opposite to each other with interposition of the variable refractive index material between the pair of electrodes; and a voltage supplier for supplying a voltage across the electrodes, in which a refractive index distribution of the variable refractive index material changes in accordance with the voltage supplied across the electrodes, so that a focal position is changed, wherein width of an electrode non-opposition region in which the pair of electrodes do not oppose each other is greater than width of an electrode opposition region in which the pair of electrodes oppose each other, and wherein the refractive index distribution of the variable refractive index material in the electrode non-opposition region is changed by the voltage supplied to the electrode pairs adjacent to each other, so that the focal position is changed.

2. The variable focal position spatial modulation device as claimed in claim 1, in which the variable refractive index material is a liquid crystal.

3. The variable focal position spatial modulation device as claimed in claim 1, in which the variable refractive index material is one of a Pockels effect material and a Kerr effect material.

4. The variable focal position spatial modulation device as claimed in claim 1, in which one of the pair of electrodes is identical to the other of the pair thereof in shape.

5. A variable focal position spatial modulation device comprising:

a variable refractive index material that is arranged inside a luminous flux and that is able to deflect an incident light;

a plurality of electrode pairs arranged at intervals in one of a concentric shape, a concentric oval shape and an unequally magnified concentric oval shape, in which a pair of electrodes of each of the electrode pairs are generally opposite to each other with interposition of the variable refractive index material between the pair of electrodes; and a voltage supplier for supplying a voltage across the electrodes, in which a refractive index distribution of the variable refractive index material changes in accordance with the voltage supplied across the electrodes, so that a focal position is changed, wherein the electrode pairs have the width thereof on one of sides of the variable refractive index material different from the width thereof on the other of sides of the variable refractive index material.

6. The variable focal position spatial modulation device as claimed in claim 5, in which the variable refractive index material is a liquid crystal.

7. The variable focal position spatial modulation device as claimed in claim 5, in which the variable refractive index material is one of a Pockels effect material and a Kerr effect material.

8. A variable focal position spatial modulation device comprising:
- a variable refractive index material that is arranged inside a luminous flux and that is able to deflect an incident light;
- a plurality of electrode pairs arranged at intervals in one of a concentric shape, a concentric oval shape and an unequally magnified concentric oval shape, in which a pair of electrodes of each of the electrode pairs are generally opposite to each other with interposition of the variable refractive index material between the pair of electrodes; and
- a voltage supplier for supplying a voltage across the electrodes, in which a refractive index distribution of the variable refractive index material changes in accordance with the voltage supplied across the electrodes, so that a focal position is changed,
- wherein the variable refractive index material is partitioned into a first region including both a first field in which the pair of electrodes of a first electrode pair of the electrode pairs oppose each other and a second field around the first field, and into a second region, adjacent to the first region, including both a third field in which the pair of electrodes of a second electrode pair of the electrode pairs oppose each other and a fourth field around the third field, and
- wherein there is provided an electric field shield that is arranged between the first region and the second region, thereby reducing the mutual influence of electric fields of the first and second regions exerting on each other.

9. The variable focal position spatial modulation device as claimed in claim 8, in which the variable refractive index material is a liquid crystal.

10. The variable focal position spatial modulation device as claimed in claim 8, in which the variable refractive index material is one of a Pockels effect material and a Kerr effect material.

11. A variable focal position spatial modulation device comprising:
- a variable refractive index material that is arranged inside a luminous flux and that is able to deflect an incident light;
- a plurality of electrode pairs arranged at intervals in one of a concentric shape, a concentric oval shape and an unequally magnified concentric oval shape, in which a pair of electrodes of each of the electrode pairs are generally opposite to each other with interposition of the variable refractive index material between the pair of electrodes;
- a voltage supplier for supplying a voltage across the electrodes, in which a refractive index distribution of the variable refractive index material changes in accordance with the voltage supplied across the electrodes, so that a focal position is changed; and
- an electric field reducing electrode that is provided adjacently to at least one of the pair of electrodes of the each of the electrode pairs and reduces the electric field formed by the at least one thereof,
- wherein the variable refractive index material is partitioned into a first region including both a first field in which the pair of electrodes of a first electrode pair of the electrode pairs oppose each other and a second field around the first field, and into a second region, adjacent to the first region, including both a third field in which the pair of electrodes of a second electrode pair of the electrode pairs oppose each other and a fourth field around the third field.

12. The variable focal position spatial modulation device as claimed in claim 11, in which the variable refractive index material is a liquid crystal.

13. The variable focal position spatial modulation device as claimed in claim 11, in which the variable refractive index material is one of a Pockels effect material and a Kerr effect material.

14. A variable focal position spatial modulation device comprising:
- a variable refractive index material that is arranged inside a luminous flux and that is able to deflect an incident light;
- a plurality of electrode pairs arranged at intervals in one of a concentric shape, a concentric oval shape and an unequally magnified concentric oval shape, in which a pair of electrodes of each of the electrode pairs are generally opposite to each other with interposition of the variable refractive index material between the pair of electrodes;
- a voltage supplier for supplying a voltage across the electrodes, in which a refractive index distribution of the variable refractive index material changes in accordance with the voltage supplied across the electrodes, so that a focal position is changed; and
- a light shield mask for shielding the luminous flux which passes through one of a ascending portion and a descending portion of the variable refractive index material, the ascending portion and the descending portion of the variable refractive index material are portions that do not have a desired refractive index distribution.

15. The variable focal position spatial modulation device as claimed in claim 14, in which the light shielding mask shields the luminous flux in an electrode opposition region in which the pair of electrodes oppose each other, and shields the luminous flux in a region of an electrode non-opposition region in which the pair of electrodes do not oppose each other, wherein the electrode non-opposition region is sandwiched between the electrode pairs adjacent to each other, and wherein the region thereof generally corresponds to a one-half portion of the electrode non-opposition region relative to a center of the electrode non-opposition region.

16. The variable focal position spatial modulation device as claimed in claim 14, in which the light shielding mask is arranged adjacently to one of the pair of electrodes of the each of the electrode pairs.

17. The variable focal position spatial modulation device as claimed in claim 14, in which the variable refractive index material is a liquid crystal.

18. The variable focal position spatial modulation device as claimed in claim 14, in which the variable refractive index material is one of a Pockels effect material and a Kerr effect material.

19. A variable focal position spatial modulation device comprising:
- a variable refractive index material that is arranged inside a luminous flux and that is able to deflect an incident light;
- a plurality of electrode pairs arranged at intervals in one of a concentric shape, a concentric oval shape and an unequally magnified concentric oval shape, in which a pair of electrodes of each of the electrode pairs are generally opposite to each other with interposition of the variable refractive index material between the pair of electrodes; and a voltage supplier for supplying a voltage across the electrodes, in which a refractive index distribution of the variable refractive index material changes in accordance with the voltage supplied across the electrodes, so that a focal position is changed, wherein interval between the electrode pairs adjacent to each other varies, so that a distance between a first adjacent electrode pair comprising a pair of electrodes and another pair of electrodes adjacent to the pair of electrodes is different from the distance between a second adjacent electrode pair comprising a pair of electrodes and another pair of electrodes adjacent to the pair of electrodes.

20. The variable focal position spatial modulation device as claimed in claim 19, in which the variable refractive index material has the characteristics that the refractive index thereof becomes smaller as the electric field energy becomes greater, and the electrode pairs are arranged in one of a condition that the interval therebetween becomes narrower as the distance becomes greater and a condition that the interval therebetween becomes wider as the distance becomes greater.

21. The variable focal position spatial modulation device as claimed in claim 19, in which the variable refractive index material has the characteristics that the refractive index thereof becomes greater as the electric field energy becomes greater, and the electrode pairs are arranged in one of a condition that the interval therebetween becomes wider as the distance becomes greater and a condition that the interval therebetween becomes narrower as the distance becomes greater.

22. The variable focal position spatial modulation device as claimed in claim 19, in which the variable refractive index material is a liquid crystal.

23. The variable focal position spatial modulation device as claimed in claim 19, in which the variable refractive index material is one of a Pockels effect material and a Kerr effect material.

24. A variable focal position spatial modulation device comprising:

a variable refractive index material that is arranged inside a luminous flux and that is able to deflect an incident light;

a plurality of electrode pairs arranged at intervals in one of a concentric shape, a concentric oval shape and an unequally magnified concentric oval shape, in which a pair of electrodes of each of the electrode pairs are generally opposite to each other with interposition of the variable refractive index material between the pair of electrodes; and a voltage supplier for supplying a voltage across the electrodes, in which a refractive index distribution of the variable refractive index material changes in accordance with the voltage supplied across the electrodes, so that a focal position is changed, wherein the voltage supplier supplies different voltages to the electrode pairs, depending on locations of the electrode pairs relative to a center of the device, resulting in realization of refraction index having spontaneous gradient at a position between adjacent pairs of electrodes.

25. The variable focal position spatial modulation device as claimed in claim 24, in which the variable refractive index material has the characteristics that the refractive index thereof becomes smaller as the electric field energy becomes greater, and the voltage supplier supplies voltage to the electrode pairs in one of a condition that the voltage supplier supplies higher voltage to an electrode pair, of the electrode pairs, which locates farther away from the center thereof, and a condition that the voltage supplier supplies lower voltage to an electrode pair, of the electrode pairs, which locates farther away from the center thereof.

26. The variable focal position spatial modulation device as claimed in claim 24, in which the variable refractive index material has the characteristics that the refractive index thereof becomes greater as the electric field energy becomes greater, and the voltage supplier supplies voltage to the electrode pairs in one of a condition that the voltage supplier supplies lower voltage to an electrode pair, of the electrode pairs, which locates farther away from the center thereof, and a condition that the voltage supplier supplies higher voltage to an electrode pair, of the electrode pairs, which locates farther away from the center thereof.

27. The variable focal position spatial modulation device as claimed in claim 24, in which the variable refractive index material is a liquid crystal.

28. The variable focal position spatial modulation device as claimed in claim 24, in which the variable refractive index material is one of a Pockels effect material and a Kerr effect material.

* * * * *